United States Patent
Yasunori et al.

(10) Patent No.: US 9,802,562 B2
(45) Date of Patent: Oct. 31, 2017

(54) AUTOMOTIVE POWER UNIT

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

(72) Inventors: Hiromichi Yasunori, Mie (JP); Kosei Maekawa, Mie (JP); Akio Ishihara, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 15/310,612

(22) PCT Filed: May 11, 2015

(86) PCT No.: PCT/JP2015/063517
§ 371 (c)(1),
(2) Date: Nov. 11, 2016

(87) PCT Pub. No.: WO2015/174379
PCT Pub. Date: Nov. 19, 2015

(65) Prior Publication Data
US 2017/0080883 A1    Mar. 23, 2017

(30) Foreign Application Priority Data

May 12, 2014    (JP) .................. 2014-098769
May 15, 2014    (JP) .................. 2014-101268

(Continued)

(51) Int. Cl.
*B60R 16/03*    (2006.01)
*B60R 16/033*    (2006.01)
(Continued)

(52) U.S. Cl.
CPC ........ *B60R 16/033* (2013.01); *B60L 11/1864* (2013.01); *B60R 16/02* (2013.01); *H02J 7/0063* (2013.01); *H02J 2007/0067* (2013.01)

(58) Field of Classification Search
CPC ....... B60R 16/02; B60R 16/03; B60R 16/033; H02J 7/0063; H02J 7/0031; H02J 7/1461
See application file for complete search history.

(56) References Cited

U.S. PATENT DOCUMENTS

2002/0140397 A1    10/2002    Hasegawa et al.
2013/0106174 A1    5/2013    Uchida
2013/0249219 A1    9/2013    Kim et al.

FOREIGN PATENT DOCUMENTS

DE    4028242 A1    3/1992
DE    102011000490 A1    3/2012
(Continued)

OTHER PUBLICATIONS

Search Report for European Appliction No. 15793314.4, dated Apr. 26, 2017, 9 pp.

*Primary Examiner* — Rexford Barnie
*Assistant Examiner* — Terrence Willoughby
(74) *Attorney, Agent, or Firm* — Dinsmore & Shohl LLP

(57) ABSTRACT

An automotive power unit includes a plurality of storage batteries; a power supply box arranged between the storage batteries and a load; a switch means that is provided in the power supply box and selects whether or not to supply power to the load from the storage batteries; and a switch control unit that detects output voltages of the storage batteries and controls the opening and closing of the switch means so as to select a storage battery for supplying power to the load. The switch control unit enables, based on a control signal that is output from a load control unit when the load is driven, a storage battery selecting operation to be performed by the switch means.

27 Claims, 22 Drawing Sheets

(30) Foreign Application Priority Data

May 19, 2014 (JP) .................................. 2014-103424
May 22, 2014 (JP) .................................. 2014-106099
May 22, 2014 (JP) .................................. 2014-106100

(51) Int. Cl.
*B60R 16/02* (2006.01)
*B60L 11/18* (2006.01)
*H02J 7/00* (2006.01)

(56) References Cited

FOREIGN PATENT DOCUMENTS

| | | | |
|---|---|---|---|
| EP | 1595748 | A1 | 11/2005 |
| EP | 2390982 | A1 | 11/2011 |
| JP | H05-176464 | A | 7/1993 |
| JP | 2009-312936 | A | 12/1997 |
| JP | 2002-305843 | A | 10/2002 |
| JP | 2005-176464 | A | 6/2005 |
| JP | 2007-089350 | A | 4/2007 |
| JP | 2008-220039 | A | 9/2008 |
| JP | 2011-207384 | A | 10/2011 |
| JP | 2013-095238 | A | 5/2013 |
| WO | 01/36232 | A1 | 5/2001 |
| WO | 2011/014597 | | 2/2011 |
| WO | 2015/059929 | A1 | 4/2015 |

AUTOMOTIVE POWER UNIT

CROSS-REFERENCE TO RELATED APPLICATIONS

This application is the U.S. national stage of PCT/JP2015/063517 filed May 11, 2015, which claims priority of Japanese Patent Application No. JP 2014-098769 filed May 12, 2014, Japanese Patent Application No. JP 2014-101268 filed May 15, 2014, Japanese Patent Application No. JP 2014-103424 filed May 19, 2014, Japanese Patent Application No. JP 2014-106099 filed May 22, 2014 and Japanese Patent Application No. Japanese Patent Application No. filed May 22, 2014.

FIELD OF THE INVENTION

The present invention relates to automotive power unit having a redundant functionality.

BACKGROUND

Recently, in order to ensure stability of power supply to various electric loads, an automotive power unit having a redundant functionality that enables the loads to be supplied with power from at least one of a plurality of storage batteries has been proposed.

In this type of power unit, when the voltage has decreased or a failure has occurred in one of the storage batteries, the loads are automatically supplied with power from the other storage batteries. JP 2013-95238A discloses a power unit that includes a battery and a capacitor which is charged with power supplied from a battery and serves as a backup power supply, and has a redundant functionality for supplying power to a load from the backup power supply if the output voltage of the battery has decreased.

In the power unit disclosed in JP 2013-95238A, the backup power supply cannot be charged if the battery has failed, and the power cannot be stably supplied to the load. Moreover, when a large current is supplied to the load, a voltage loss occurs due to a diode arranged on a redundant path, and heat is generated. Accordingly, the power unit in JP 2013-95238A is not suitable for supplying power to a load having a large current capacity.

SUMMARY OF INVENTION

An object of the present invention is to provide an automotive power unit capable of stably supplying power to a load. An automotive power unit according to a first aspect of the present invention is an automotive power unit including: a plurality of storage batteries; a power supply box to be arranged between the storage batteries and a load; switch means for selecting whether or not to supply power to the load from the storage batteries, the switch means being provided in the power supply box; and a switch control unit that detects output voltages of the storage batteries and controls opening and closing of the switch means so as to select a storage battery for supplying power to the load, wherein the switch control unit enables, based on a control signal that is output from a load control unit when the load is driven, a storage battery selecting operation to be performed by the switch means.

With this configuration, upon the control signal being input from the load control unit, the load is supplied with power from the storage battery selected by the switch means.

In the above automotive power unit, it is preferable that the switch control unit includes a comparator that compares the output voltages of the storage batteries with each other and a logic circuit that controls, based on the control signal, opening and closing of the switch means in correspondence with a comparison result of the comparator.

With this configuration, the storage battery for supplying power to the load is selected based on the output voltages of the storage batteries, and the load is supplied with power from the selected storage battery based on the input of the control signal.

In the above automotive power unit, it is preferable that the switch control unit includes a power supply monitoring unit that selects, based on the output voltages of the storage batteries, one of the storage batteries based on a preset program and a driving unit that controls, based on the control signal, the switch means so as to supply power to the load from the storage battery selected by the power supply monitoring unit.

With this configuration, the storage battery for supplying power to the load is selected based on a preset program and based on the output voltages of the storage batteries, and the load is supplied with power from the selected storage battery based on the input of the control signal.

In the above automotive power unit, it is preferable that the switch control unit includes a power supply monitoring ECU that selects, based on the output voltages of the storage batteries, one of the storage batteries based on a preset program, and controls, based on the control signal, the switch means so as to supply power to the load from the selected storage battery.

With this configuration, the storage battery for supplying power to the load is selected based on a preset program and based on the output voltages of the storage batteries by the power supply monitoring ECU, and the load is supplied with power from the selected storage battery based on the input of the control signal.

In the above automotive power unit, it is preferable that the switch means includes one or more relays that are subjected to open/close control by the switch control unit.

With this configuration, the load is supplied with power from the storage batteries via the relays.

In the above automotive power unit, it is preferable that the switch means includes one or more power MOSFETs that are subjected to open/close control by the switch control unit.

With this configuration, the load is supplied with power from the storage batteries via the power MOSFETs.

In some examples, the automotive power unit further includes a current control means that supplies power supplied from the storage batteries, from the power supply box to each of the loads using one power source line, allows supply of power from the storage batteries to the load, and keeps a current from flowing between the storage batteries.

With this configuration, each load can be supplied with power from at least one of the storage batteries using one power source line, and a current can be kept from flowing between the storage batteries.

It is preferable that the current control means includes a plurality of switches constituting the switch means, and each being arranged between the power source line and a corresponding storage battery and the switch control unit including a power supply monitoring unit that monitors the output voltages of the storage batteries, and a driving unit that makes a switch connected to a storage battery having a low output voltage non-conductive when the power supply monitoring unit has detected a difference between the output voltages of the storage batteries, and at least the plurality of switches are provided in the power supply box.

With this configuration, the load is supplied with power from the storage batteries via the switches and the power source line. If a voltage difference occurs between the storage batteries, the switch connected to the storage battery with a lower output voltage is made non-conductive, and a current is kept from flowing.

It is preferable that the current control means includes a comparator that compares the output voltages of the storage batteries.

With this configuration, the output voltages of the storage batteries are compared by the comparator, and the switch connected to the storage battery with a lower output voltage is made non-conductive based on an output signal of the comparator.

It is preferable that the power supply monitoring unit is configured to, when detecting that an output voltage of each of the storage batteries or a difference between the output voltages of the storage batteries is in an abnormal range, make a switch means connected to this storage battery non-conductive, and is provided in the power supply box.

With this configuration, the output voltage of each storage battery is monitored by the power supply monitoring unit. When the output voltage is in an abnormal range, or when the difference in the output voltage is in an abnormal range, the switch connected to the storage battery with a lower output voltage is made non-conductive.

It is preferable that one of the storage batteries is directly connected to a starter motor, and a switch connected to the one of the storage batteries is set to a non-conductive state when the starter motor operates.

With this configuration, when the starter motor operates, the switch connected to the storage battery that supplies power to this starter motor is made non-conductive.

It is preferable that the current control means is constituted by a plurality of diodes, each having an anode connected to the storage batteries side, and having a cathode connected to the power source line side.

With this configuration, the load is supplied with power from the storage batteries via the diodes, and a current is kept from flowing between the storage batteries by the diodes.

In some examples, the power unit further includes a redundant power supply device configured to supply power to a load group from at least one of a first storage battery and a second storage battery that are included in the plurality of storage batteries and a separation device arranged between the redundant power supply device and each of the first storage battery and the second storage battery and, when one of the first storage battery and the second storage battery has made a short circuit, opens a contact provided between the one of the storage batteries and the other of the storage batteries.

With this configuration, if one of the storage batteries enters a short-circuit state, the contact is opened by the separation device, and the one of the storage batteries is electrically separated from the other of the storage batteries.

It is preferable that the separation device includes a relay that is provided with a coil through which, when one of the first storage battery and the second storage battery has made a short circuit, a current serving as an excitation current flows toward the one of the storage batteries from the other of the storage batteries, and is also provided with a contact that is opened based on the excitation current and electrically separates the one of the storage batteries from the other of the storage batteries.

With this configuration, when one of the storage batteries has made a short circuit, a current flowing from the other of the storage batteries toward the one of the storage batteries serves as an excitation current flowing through the coil, the contact is opened based on this excitation current, and the first storage battery and the second storage battery are electrically separated.

In some examples, it is preferable that the separation device is provided with a forcible separation device that is connected to the relay and causes an excitation current to flow through the coil based on input of a separation signal.

With this configuration, if an excitation current is supplied to the coil from the forcible separation device, the first storage battery and the second storage battery are electrically separated.

It is preferable that the separation device includes a relay that is provided with a coil, an excitation current that is supplied from one of the first storage battery and the second storage battery and flows through the coil being cut off when the one of the first storage battery and the second storage battery has made a short circuit, and is also provided with a contact that is opened based on the cutting-off of the excitation current and electrically separates the one of the storage batteries from the other of the storage batteries.

With this configuration, if one of the storage batteries has entered a short-circuit state, the excitation current supplied from the one of the storage batteries is cut off to open the contact, and the one of the storage batteries is electrically separated from the other of the storage batteries.

It is preferable that the separation device is housed in the power supply box provided between the first and second storage batteries and the redundant power supply device.

With this configuration if the contact is opened in the junction box, one of the storage batteries and the other of the storage batteries are electrically separated.

In some examples, the power supply box is configured to supply power to a plurality of loads from at least one of the plurality of storage batteries. The power unit further includes: an alternator that supplies power to the storage batteries and the loads; a plurality of switches included in the switch means and each having an input terminal connected to a corresponding one of the plurality of storage batteries; power source supply lines each connecting a node between output terminals of the plurality of switches to a corresponding one of the plurality of loads; and a power supply line that supplies power from the alternator to the node, wherein the switch control unit is configured to directly or indirectly acquire current values of currents flowing through the plurality of switches and the plurality of storage batteries and, when a current value of a current flowing through each of the storage batteries and the current value of a current flowing through a switch connected to this storage battery are different, performs control for setting this switch to a non-conductive state. For example, the power unit further includes a plurality of current detection means, each of which detects a current value of a current flowing through a corresponding one of the plurality of switches or a corresponding one of the plurality of storage batteries, wherein the switch control unit is configured to, when the current value of a current flowing through each of the storage batteries and the current value of a current flowing through a switch connected to this storage battery are different based on a detection signal of the plurality of current detection means, performs control for setting this switch to a non-conductive state.

With this configuration, the loads can be supplied with power from at least one of the storage batteries using one power source supply line for each load, and the storage batteries and the loads can also be supplied with power from the alternator using one power source supply line. In addition, a current can be kept from flowing between the storage batteries.

The current detection means are each constituted by a Hall element.

With this configuration, the current values of currents flowing through the storage batteries and the switches can be detected by the respective Hall elements.

It is preferable that the power unit further includes a voltage detection unit that detects a voltage across an input terminal and an output terminal of each of the switches, wherein the switch control unit detects a current value of a current based on the voltage across the terminals detected by the voltage detection unit.

With this configuration, the current value of a current flowing through each switch is detected based on the voltage across the input terminal and the output terminal of the switch.

It is preferable that the switches are each constituted by a relay or a semiconductor relay that is subjected to open/close control based on an excitation current which is output from the switch control unit.

With this configuration, when the current value of a current flowing through each storage battery and the current value of a current flowing through the contact in the relay connected to this storage battery are different, control is performed for setting the contact in this relay to a non-conductive state.

In some examples, the plurality of storage batteries are three storage batteries, the plurality of switches are three switches connected to the three storage batteries in one-to-one correspondence, and current detection means are provided so as to each detect a current value of a current flowing through a corresponding one of the three switches or a corresponding one of the three storage batteries.

With this configuration, the loads are supplied with power from at least one of the three storage batteries, and a current flowing from one of the storage batteries toward the other of the storage batteries is cut off.

In some examples, the power supply box is configured to supply power to a plurality of loads from at least one of the plurality of storage batteries, the power unit further includes: a plurality of switches included in the switch means and each having an input terminal connected to a corresponding one of the plurality of storage batteries; and power supply lines connected to the loads in one-to-one correspondence, and the switch control unit detects a direction of a current flowing through each of the switches, and controls opening and closing of the plurality of switches so as to cut off a current flowing from one of the storage batteries toward the other of the storage batteries.

With this configuration, the loads can be supplied with power from at least one of the storage batteries using one power source supply line, and a current can be kept from flowing among the storage batteries.

In some examples, it is preferable that the power unit further includes a voltage detection unit that detects a voltage across an input terminal and an output terminal of each of the switches, wherein the switch control unit detects, based on a detection signal of the voltage detection unit, a direction of a current flowing between the input terminal and the output terminal of each of the switches, and controls opening and closing of each of the switches.

With this configuration, if a current flowing from one of the storage batteries toward the other of the storage batteries is detected by the voltage detection unit and the switch control unit, the switch enters a non-conductive state to cut off the current flowing from the one of the storage batteries toward the other of the storage batteries.

It is preferable that the switches are each constituted by a relay or a semiconductor relay that is subjected to open/close control based on an excitation current which is output from the switch control unit.

With this configuration, if a current flowing from one of the storage batteries toward the other of the storage batteries is detected by the voltage detection unit and the switch control unit, the contact in the relay enters a non-conductive state to cut off the current flowing from the one of the storage batteries toward the other of the storage batteries.

In some examples, it is preferable that the power unit further includes a plurality of diodes connected to the plurality of switches in one-to-one correspondence, each of the plurality of diodes having an anode terminal connected to the plurality of storage batteries in one-to-one correspondence, and a cathode terminal connected to one of the plurality of loads or each of the loads.

With this configuration, a current flowing from one of the storage batteries toward the other of the storage batteries is cut off by the diodes.

It is preferable that the plurality of storage batteries are three storage batteries, the plurality of switches are three switches connected to the three storage batteries in one-to-one correspondence, and the voltage detection unit is three voltage detection units each detecting a voltage across an input terminal and an output terminal of a corresponding one of the three switches.

With this configuration, the loads are supplied with power from at least one of the three storage batteries, and a current flowing from one of the storage batteries toward the other of the storage batteries is cut off.

According to some aspects of the present invention, an automotive power unit that stably supplies power to a load can be provided. Other aspects and advantages of the present invention will be clear from the following description as well as the drawings that illustrates examples of the technical idea of the present invention.

DETAILED DESCRIPTION OF THE PREFERRED EMBODIMENTS

First Embodiment

Figure 1:
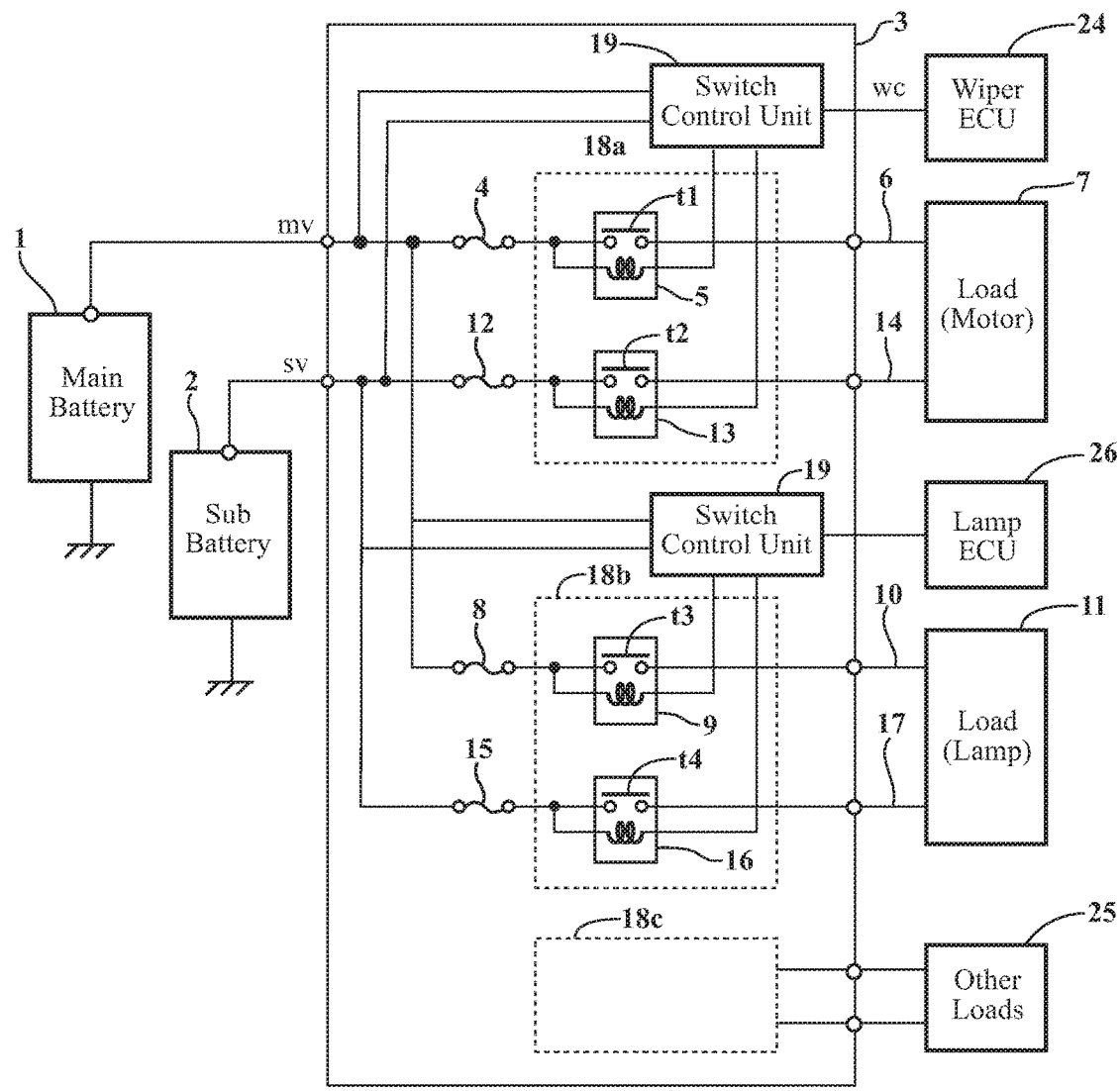
FIG. 1 is a block diagram showing a first embodiment.

A first embodiment of an automotive power unit will be hereinafter described in accordance with FIGS. 1 to 3. A main battery 1 and a sub-battery 2 are connected to a power supply box 3. Both the main battery 1 and the sub-battery 2 are storage batteries, and are charged by being supplied with power from an alternator (not shown) at the time of a regenerative operation, for example.

The power supply box 3 has a redundant functionality that enables a load having a large current capacity and other load groups to be supplied with power from at least one of the main battery 1 and the sub-battery 2.

For example, the main battery 1 is connected to a load 7, such as a wiper motor, via a fuse 4 and a contact t1 in a relay 5 that are provided in the power supply box 3, as well as a power source line 6 that extends to the outside of the power supply box 3. Accordingly, when the contact t1 in the relay 5 is in a conductive state, the load 7 is supplied with power from the main battery 1 via the fuse 4 and the contact t1.

The main battery 1 is connected to a load 11, such as a head lamp, via a fuse 8 and a contact t3 in a relay 9 that are provided in the power supply box 3, as well as a power source line 10 that extends to the outside of the power supply box 3. Accordingly, when the contact t3 in the relay 9 is in a conductive state, the load 11 is supplied with power from the main battery 1 via the fuse 8 and the contact t3.

The sub-battery 2 is connected to the load 7 via a fuse 12 and a contact t2 in a relay 13 that are provided in the power supply box 3, as well as a power source line 14 extending to the outside of the power supply box 3. Accordingly, when the contact t2 in the relay 13 is in a conductive state, the load 7 is supplied with power from the sub-battery 2 via the fuse 12 and the contact t2.

The sub-battery 2 is connected to the load 11 via a fuse 15 and a contact t4 in a relay 16 that are provided in the power supply box 3, as well as a power source line 17 extending to the outside of the power supply box 3. Accordingly, when the contact t4 in the relay 16 is in a conductive state, the load 11 is supplied with power from the sub-battery 2 via the fuse 15 and the contact t4.

With this configuration, the load 7 is supplied with power from one of the main battery 1 and the sub-battery 2 via a switch means 18a that is constituted by the relays 5 and 13. The load 11 is supplied with power from one of the main battery 1 and the sub-battery via a switch means 18b that is constituted by the relays 9 and 16. Loads 25 other than the wiper motor and the lamp are also supplied with power via other similar switch means 18c. The switch means 18a, 18b, and 18c each may also be called "switch circuitry".

In the example in FIG. 1, a switch control unit 19 that is connected to a wiper ECU 24 and the switch means 18a, and a switch control unit 19 that is connected to a lamp ECU 26 and the switch means 18b are shown. The switch means 18c may be connected to a switch control unit that is not shown. The switch control units 19 may also be called "switch control circuits" or "switch controllers". The wiper ECU 24 and the lamp ECU 26 are examples of load control units.

The switch means 18a to 18c are each subjected to open/close control (i.e. they are opened and closed) by the corresponding switch control unit 19. The switch control unit 19 that controls the opening and closing of the switch means 18a will be described in accordance with FIG. 2.

The switch control unit 19 includes comparators 20 and 21, and logic circuits, which may be NAND circuits 22 and 23. An output voltage mv of the main battery 1 and an output voltage sv of the sub-battery 2 are input respectively to the comparators 20 and 21.

The comparator 20 compares the output voltages mv and sv of the main battery 1 and the sub-battery 2, and when the output voltage mv of the main battery 1 is lower than the output voltage sv of the sub-battery 2, the comparator 20 outputs a high-level output signal to one input terminal of the NAND circuit 22. When the output voltage mv of the main battery 1 is higher than the output voltage sv of the sub-battery 2, the comparator 20 outputs a low-level output signal to one input terminal of the NAND circuit 22.

A control signal wc that is output from the wiper ECU 24 for controlling operation of the load 7 is input to the other input terminal of the NAND circuit 22. The control signal wc is a signal that is set to a high level when driving the load 7.

Accordingly, if the output voltage mv of the main battery 1 is higher than the output voltage sv of the sub-battery 2 and the control signal wc is set to a high level, the output signal of the NAND circuit 22 is set to a low level. Then, an excitation current flows through a coil in the relay 5 from the main battery 1, the contact t1 enters a conductive state, and the load 7 can be supplied with power from the main battery 1.

When the output voltage mv of the main battery 1 is lower than the output voltage sv of the sub-battery 2, the output signal of the comparator 20 is set to a low level. Then, regardless of the control signal wc, the output signal of the NAND circuit 22 is set to a high level, and the excitation current ceases to flow through the coil in the relay 5. As a result, the contact t1 in the relay 5 enters a non-conductive state, and the power supply to the load 7 from the main battery 1 is cut off.

The comparator 21 compares the output voltages mv and sv of the main battery 1 and the sub-battery 2, and when the output voltage sv of the sub-battery 2 is higher than the output voltage mv of the main battery 1, the comparator 21 outputs a high-level output signal to one input terminal of the NAND circuit 23. When the output voltage sv of the sub-battery 2 is lower than the output voltage mv of the main battery 1, the comparator 21 outputs a low-level output signal to one input terminal of the NAND circuit 23.

The control signal wc is input to the other input terminal of the NAND circuit 23. Accordingly, when the output voltage sv of the sub-battery 2 is higher than the output voltage mv of the main battery 1 and the control signal wc is set to a high level, the output signal of the NAND circuit 22 is set to a low level. Then, an excitation current flows through a coil in the relay 13 from the sub-battery 2, the contact t2 enters a conductive state, and the load 7 can be supplied with power from the sub-battery 2.

When the output voltage sv of the sub-battery 2 is lower than the output voltage mv of the main battery 1, the output signal of the comparator 20 is set to a low level. Then, regardless of the control signal wc, the output signal of the NAND circuit 23 is set to a high level, and the excitation current ceases to flow through the coil in the relay 13. As a result, the contact t2 in the relay 13 enters a non-conductive state, and the power supply to the load 7 from the sub-battery 2 is cut off.

With this configuration, when the high-level control signal wc is output from the wiper ECU 24, the switch means 18a operates such that the power is supplied to the load 7 from one of the main battery 1 and the sub-battery 2.

When the load 7 is not in use, a low-level control signal wc is output from the wiper ECU 24. Then, both the contacts t1 and t2 in the relays 5 and 13 enter a non-conductive state, and the load 7 is not supplied with power.

The switch control unit 19 that controls the switch means 18b has a configuration similar to that of the switch control unit 19 that controls the switch means 18a except that a control signal is input thereto from the ECU 26 for controlling the lamp.

Next, the operation of the power unit having the above-described configuration will be described.

When the load 7, i.e. the wiper is not in use, a low-level control signal wc is output from the wiper ECU 24. Then, both the output signals of the NAND circuits 22 and 23 are set to a high level, both the contacts t1 and t2 enter a non-conductive state, and the power supply to the load 7 is cut off.

If a high-level control signal wc is input in a state where the main battery 1 and the sub-battery 2 have been normally charged and output roughly the same voltage, one of the contacts t1 and t2 in the relays 5 and 13 enters a conductive state based on the output signals of the comparators 20 and 21.

Then, the load 7 is supplied with one of the main battery 1 and the sub-battery 2.

Figure 3:
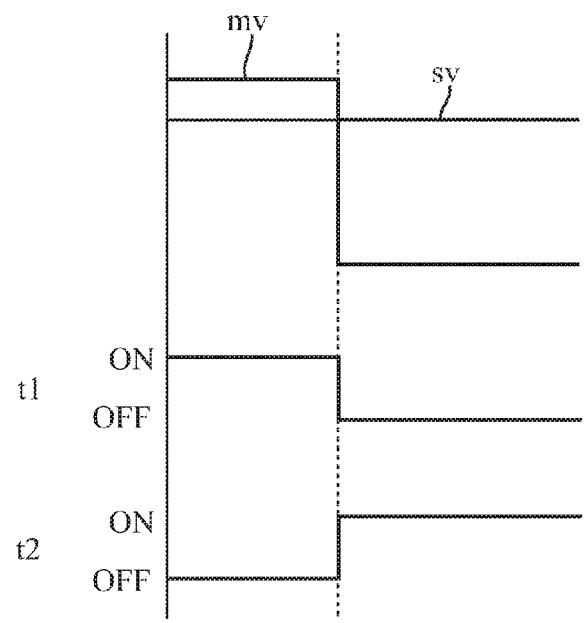
FIG. 3 is a timing chart showing operation according to the first embodiment.

As shown in FIG. 3, if the output voltage mv of the main battery 1 has decreased, or the main battery 1 has failed, the output signal of the comparator 20 is set to a low level, and the output signal of the NAND circuit 22 is set to a high level. As a result, the contact t1 in the relay 5 becomes non-conductive, the contact t2 in the relay 13 enters a conductive state, and the load 7 is supplied with power from the sub-battery 2.

If the voltage of the sub-battery 2 has decreased, or the sub-battery 2 has failed, the output signal of the comparator 21 is set to a low level, and the output signal of the NAND circuit 23 is set to a high level. As a result, the contact t2 in the relay 13 becomes non-conductive, and the load 7 is supplied with power from the main battery 1. The switch means 18b and 18c also operate in a similar manner.

In the first embodiment, the following effects can be achieved.

If the output voltage of one of the main battery 1 and the sub-battery 2 has decreased, or one of the main battery 1 and the sub-battery 2 has failed or grounded, the loads 7 and 11 can be supplied with power from the other battery. Accordingly, it is possible to achieve redundancy of the power supply and stably supply necessary power to the loads 7 and 11.

The relays 5, 9, 13, and 16 in the power supply box can be used for the functionality of load relays that control whether or not to supply power to the loads 7 and 11. Accordingly, no load relays need to be separately provided between the power supply box 3 and the loads 7 and 11, and it is therefore possible to reduce the number of components and reduce costs for the power unit.

Second Embodiment

FIGS. 4 to 9 show a second embodiment. In this embodiment, a switch control unit that controls operation of the switch means 18a based on a preset program is provided in place of the switch control unit 19 in the first embodiment. A description will be given of the switch control unit that controls the switch means 18a for controlling the opening and closing of the power supply to the load 7. The same constituent parts as those in the first embodiment will be assigned the same reference numerals, and their further description will be omitted.

Figure 4:
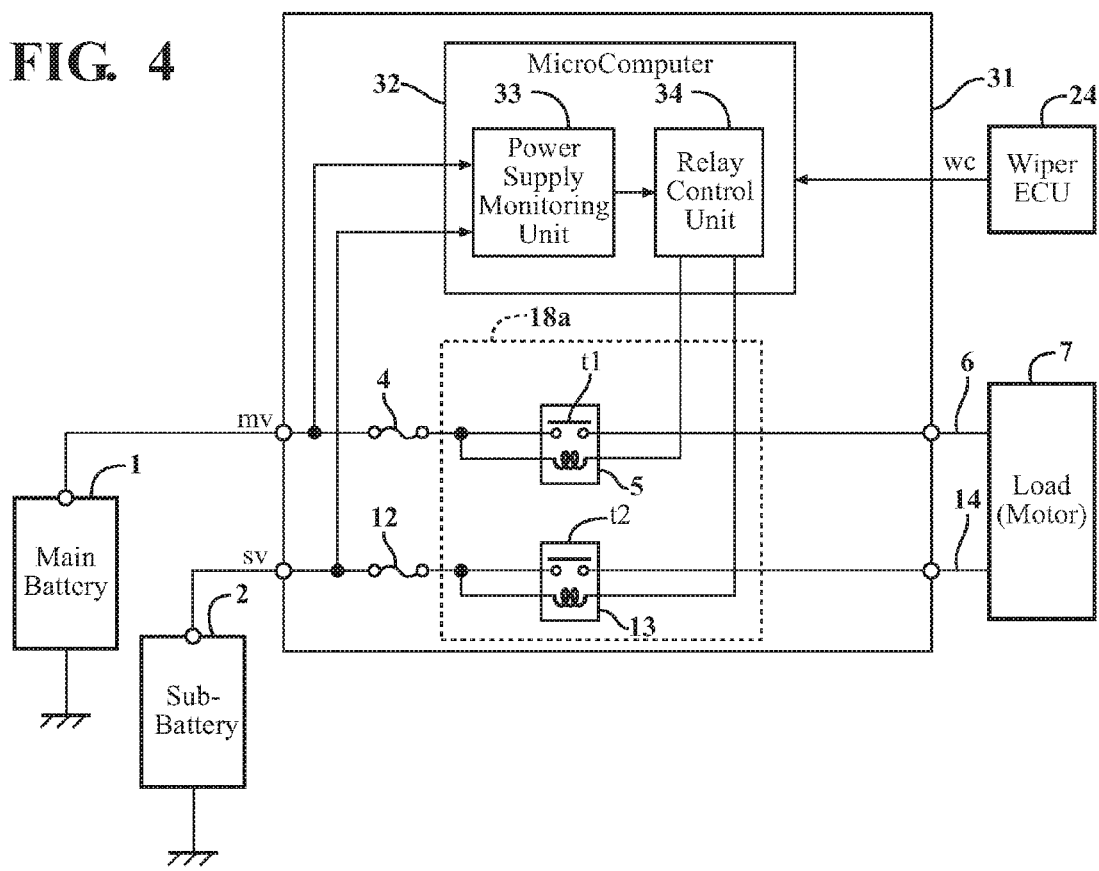
FIG. 4 is a block diagram showing a second embodiment.

As shown in FIG. 4, the power supply box 31 includes a microcomputer 32 provided as a switch control unit, and this microcomputer 32 is provided with a power supply monitoring unit 33 and a relay control unit (driving unit) 34.

The output voltage mv of the main battery 1 and the output voltage sv of the sub-battery 2 are input to the power supply monitoring unit 33. The power supply monitoring unit 33 drives the relay control unit 34 based on the output voltages mv and sv, supplies an excitation current to the coils in the relays 5 and 13, and performs control such that one of or both the contacts t1 and t2 in the relays 5 and 13 are in a conductive state.

The power supply monitoring unit 33 is provided with a plurality of programs for controlling the opening and closing of the relays 5 and 13, and open/close operation of the relays 5 and 13 can be controlled by selecting one of the programs.

The control signal wc output from the wiper ECU 24 is input to the relay control unit 34. The control signal wc is a signal that is set to a high level when driving the load 7. When the control signal wc is set to a high level, the relay control unit 34 sets at least one of the contacts t1 and t2 in the relays 5 and 13 to a conductive state based on the output signal of the power supply monitoring unit 33.

If the control signal wc is set to a low level, both the contacts t1 and t2 in the relays 5 and 13 enter a non-conductive state, and the power supply to the load 7 is cut off.

A description will be given below of the open/close control operations that are based on the respective programs in the case where the control signal we is set to a high level.

First Open/Close Control

Figure 7:
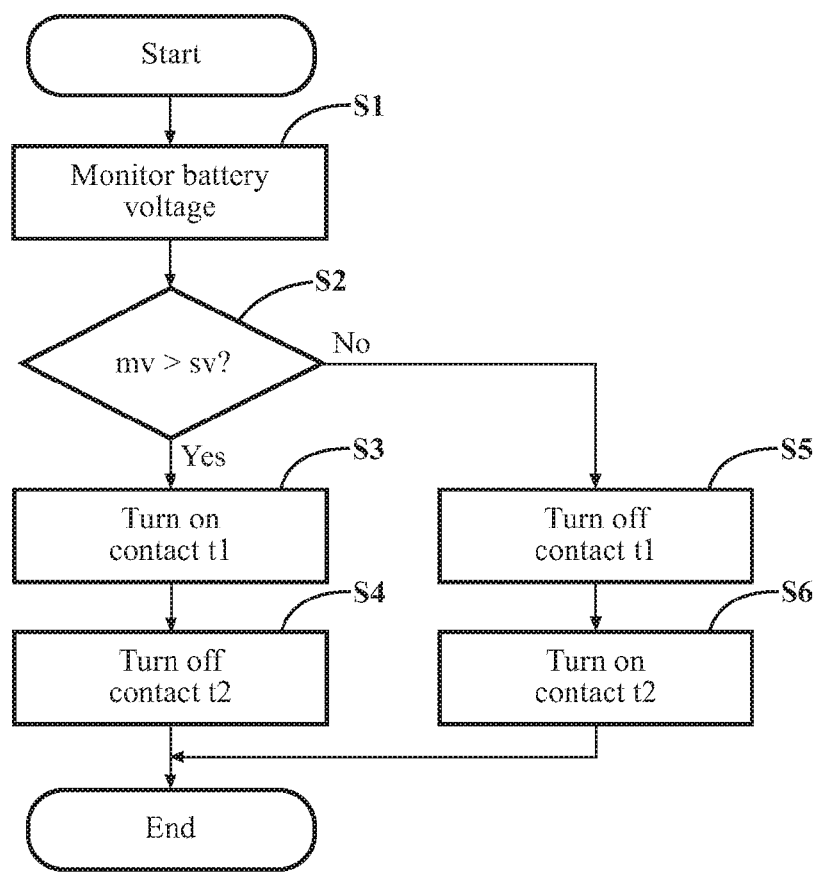
FIG. 7 is a flowchart showing operation according to the second embodiment.

As shown in FIG. 7, the power supply monitoring unit 33 compares the output voltage mv of the main battery 1 with the output voltage sv of the sub-battery 2, while monitoring the output voltage mv of the main battery 1 and the output voltage sv of the sub-battery 2 (steps S1 and S2).

If, in step S2, the output voltage mv of the main battery 1 is higher than the output voltage sv of the sub-battery 2, the contact t1 in the relay 5 is set to a conductive state, and the contact t2 in the relay 13 is made non-conductive (steps S3 and S4). In this state, the load 7 can be supplied with power from the main battery 1.

If, in step S2, the output voltage sv of the sub-battery 2 is higher than the output voltage mv of the main battery 1, the contact t1 in the relay 5 is set to a non-conductive state, and the contact t2 in the relay 13 is set to a conductive state (steps S5 and S6). In this state, the load 7 can be supplied with power from the sub-battery 2. This open/close control operation is similar to that in the first embodiment.

Second Open/Close Control

Figure 8:
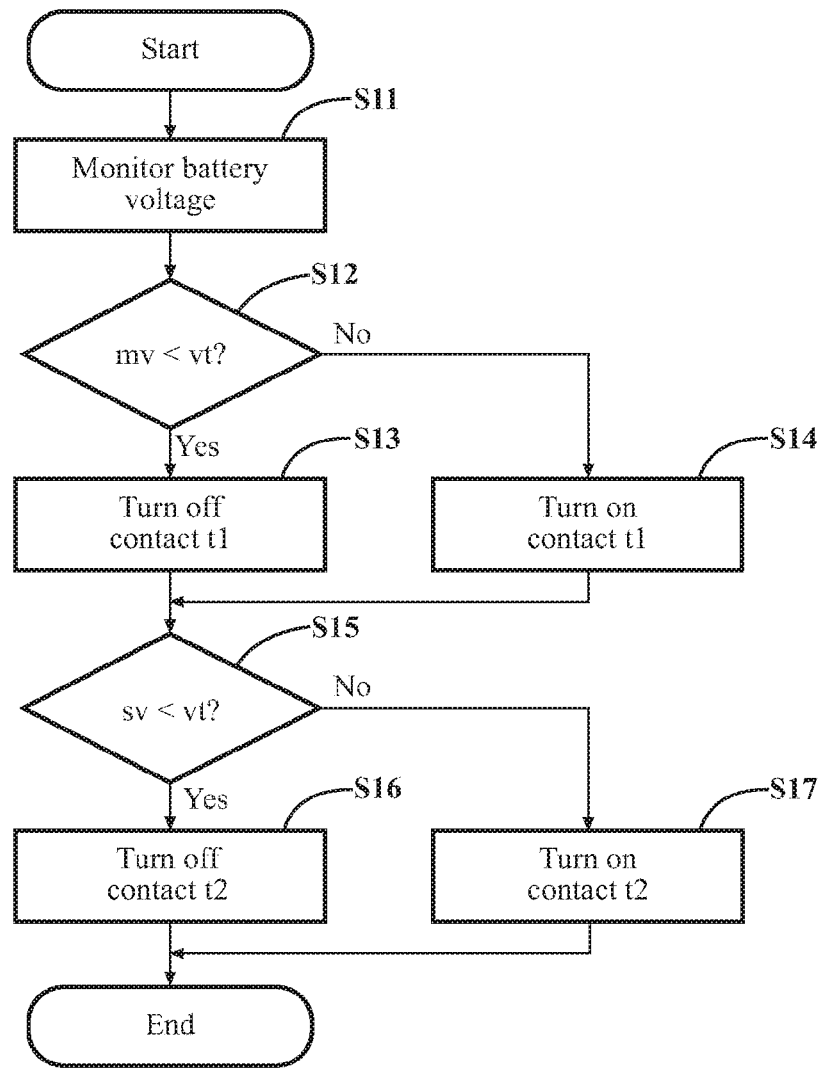
FIG. 8 is a flowchart showing operation according to the second embodiment.

As shown in FIG. 8, the power supply monitoring unit 33 compares the output voltage mv of the main battery 1 with a preset threshold voltage vt, while monitoring the output voltage mv of the main battery 1 and the output voltage sv of the sub-battery 2 (steps S11 and S12).

The threshold voltage vt is a lower limit voltage for determining that the output voltages mv and sv of the main battery 1 and the sub-battery 2 are normal.

Figure 5:
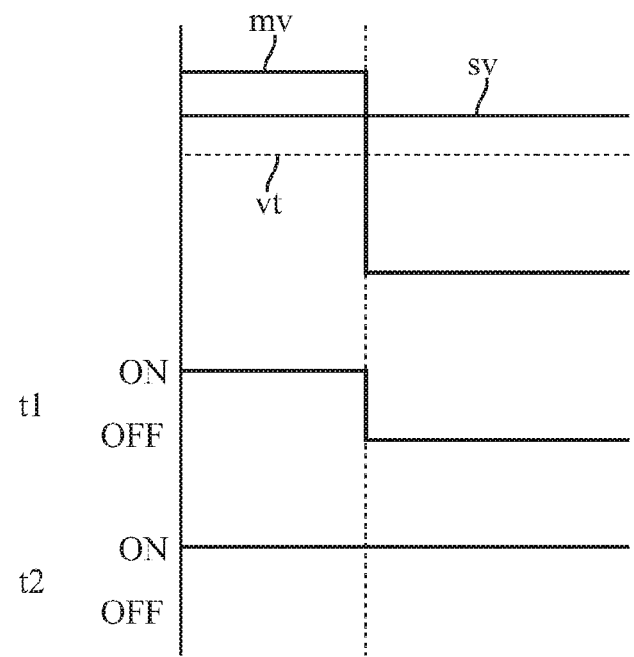
FIG. 5 is a timing chart showing operation according to the second embodiment.

As shown in FIG. 5, if, in step S12, the output voltage mv of the main battery 1 is lower than the threshold voltage vt, it is determined that the main battery 1 is not operating normally, and the contact t1 in the relay 5 is set to a non-conductive state (step S13).

If the output voltage mv of the main battery 1 is higher than the threshold voltage vt, it is determined that the main battery 1 is operating normally, and the contact t1 in the relay 5 is set to a conductive state (step S14).

Next, the output voltage sv of the sub-battery 2 is compared with the preset threshold voltage vt (step S15).

If, in step S15, the output voltage sv of the sub-battery 2 is lower than the threshold voltage vt, it is determined that the sub-battery 2 is not working normally, the contact t2 in the relay 13 is set to a non-conductive state (step S16), and the open/close control operation ends.

If the output voltage sv of the sub-battery 2 is higher than the threshold voltage vt, it is determined that the sub-battery 2 is operating normally, the contact t2 in the relay 13 is set to a conductive state (step S17), and the open/close control operation ends.

In this open/close control operation, if both the output voltages mv and sv of the main battery 1 and the sub-battery 2 are higher than the threshold voltage vt, both the contacts t1 and t2 in the relays 5 and 13 are set to a conductive state. Accordingly, the load 7 is supplied with power from the main battery 1 and the sub-battery 2.

If one of the output voltages mv and sv of the main battery 1 and the sub-battery 2 is lower than the threshold voltage vt, the power is supplied from a battery whose output voltage is kept normally.

If both the output voltages mv and sv of the main battery 1 and the sub-battery 2 are lower than the threshold voltage vt, both the contacts t1 and t2 in the relays 5 and 13 are set to a non-conductive state, and the power supply to the load is cut off.

Third Open/Close Control

Figure 9:
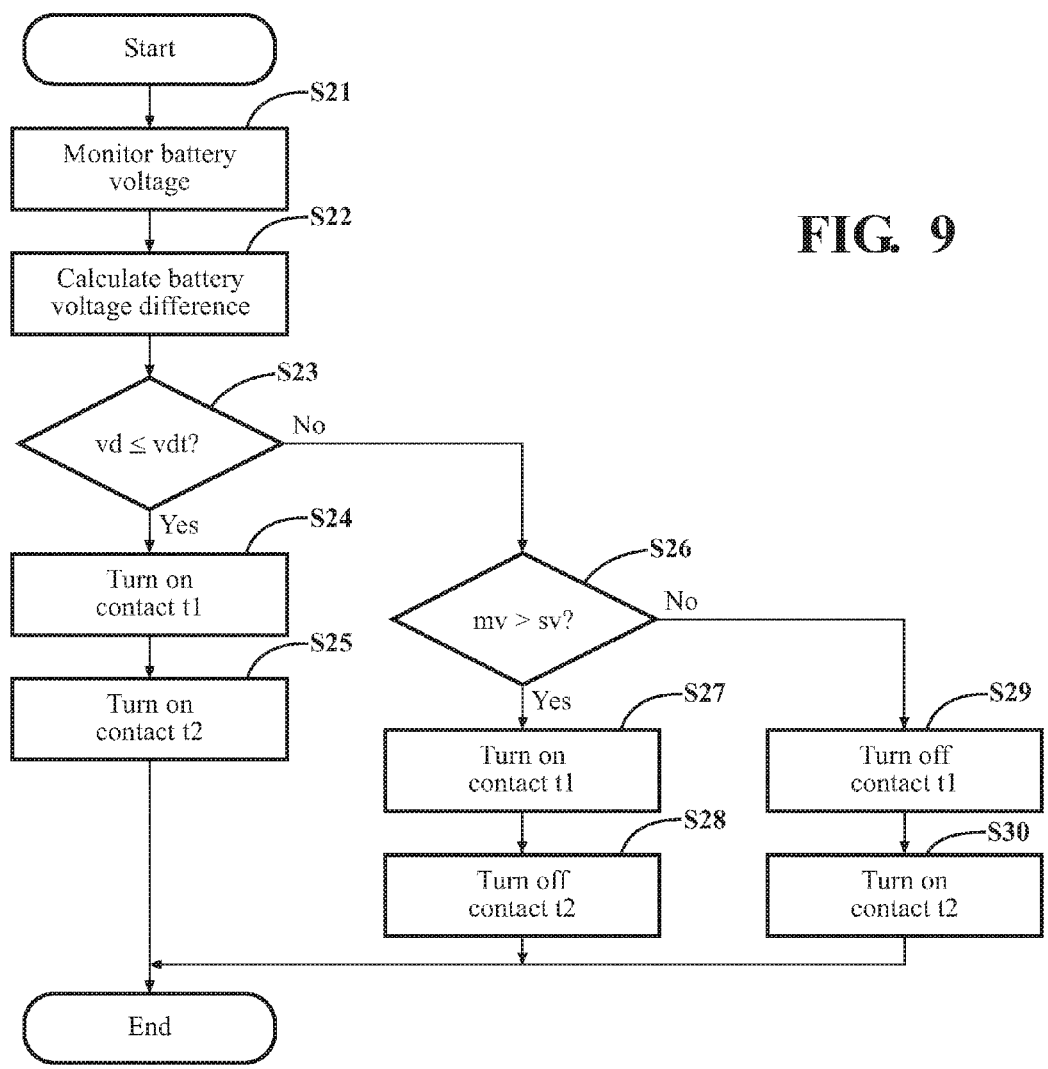
FIG. 9 is a flowchart showing operation according to the second embodiment.

As shown in FIG. 9, the power supply monitoring unit 33 calculates a difference vd between the output voltage mv of the main battery 1 and the output voltage sv of the sub-battery 2, while monitoring the output voltage mv of the main battery 1 and the output voltage sv of the sub-battery 2 (steps S21 and S22).

Next, it is determined whether or not the calculated difference vd is smaller than or equal to a preset threshold value vdt (step S23). The threshold value vdt is for setting the upper limit of the difference vd between the output voltage mv of the main battery 1 and the output voltage sv of the sub-battery, and the difference vd exceeds the threshold value vdt when the output voltage of one of the main battery 1 and the sub-battery 2 has significantly decreased.

Figure 6:
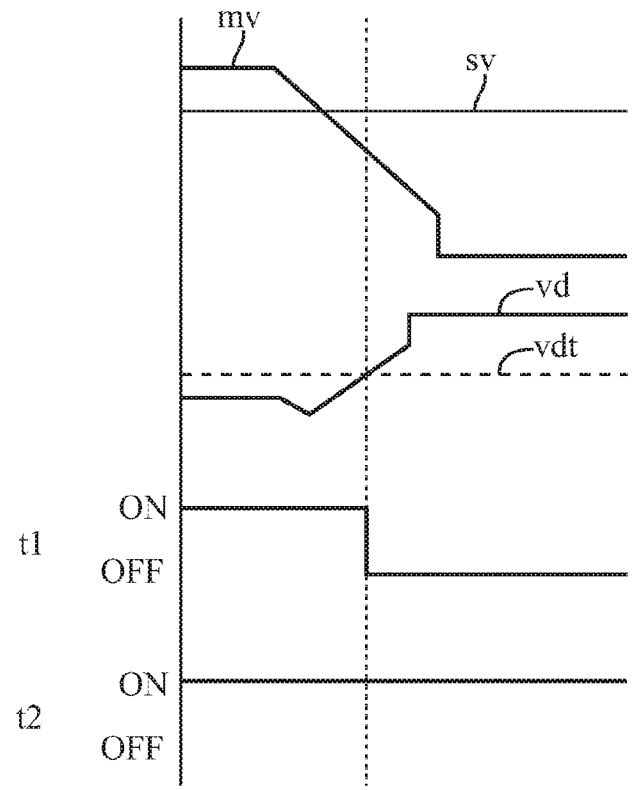
FIG. 6 is a timing chart showing operation according to the second embodiment.

As shown in FIG. 6, if, in step S23, the difference vd is smaller than or equal to the threshold value vdt, both the contacts t1 and t2 in the relays 5 and 13 are set to a conductive state (steps S24 and S25).

If, in step S23, the difference vd is larger than the threshold value vdt, the processing proceeds to step S26, and the output voltage mv of the main battery 1 and the output voltage sv of the sub-battery 2 are compared with each other.

If the output voltage mv of the main battery 1 is higher than the output voltage sv of the sub-battery 2, it is determined that the output voltage sv of the sub-battery 2 is abnormal, the contact t1 in the relay 5 is set to a conductive state, and the contact t2 in the relay 13 is set to a non-conductive state. Then, the load 7 can be supplied with power from the main battery 1.

If, in step S26, the output voltage sv of the sub-battery 2 is higher than the output voltage mv of the main battery 1, it is determined that the output voltage mv of the main battery 1 is abnormal, the contact t2 in the relay 13 is set to a conductive state, and the contact t1 in the relay 5 is set to a non-conductive state. Then, the load 7 can be supplied with power from the sub-battery 2.

The automotive power unit according to the second embodiment can achieve the following effects in addition to the effects achieved by the first embodiment.

If both the output voltage mv of the main battery 1 and the output voltage sv of the sub-battery 2 are higher than the threshold voltage vt, both the contacts t1 and t2 are set to a conductive state, and the load 7 can be supplied with power from the main battery 1 and the sub-battery 2.

In the third open/close control, the contacts t1 and t2 in the relays 5 and 13 are subjected to the open/close control based on the difference vd between the output voltage mv of the main battery 1 and the output voltage sv of the sub-battery 2. Accordingly, even if both the output voltage mv of the main battery 1 and the output voltage sv of the sub-battery 2 have decreased, the load 7 can be supplied with power from the main battery 1 and the sub-battery 2 unless the difference vd therebetween exceeds the threshold value vdt. Furthermore, even if both the output voltage mv of the main battery 1 and the output voltage sv of the sub-battery 2 have decreased and the difference vd exceeds the threshold value vdt, the load 7 can be supplied with power from one of the batteries with the higher output voltage.

Third Embodiment

Figure 10:
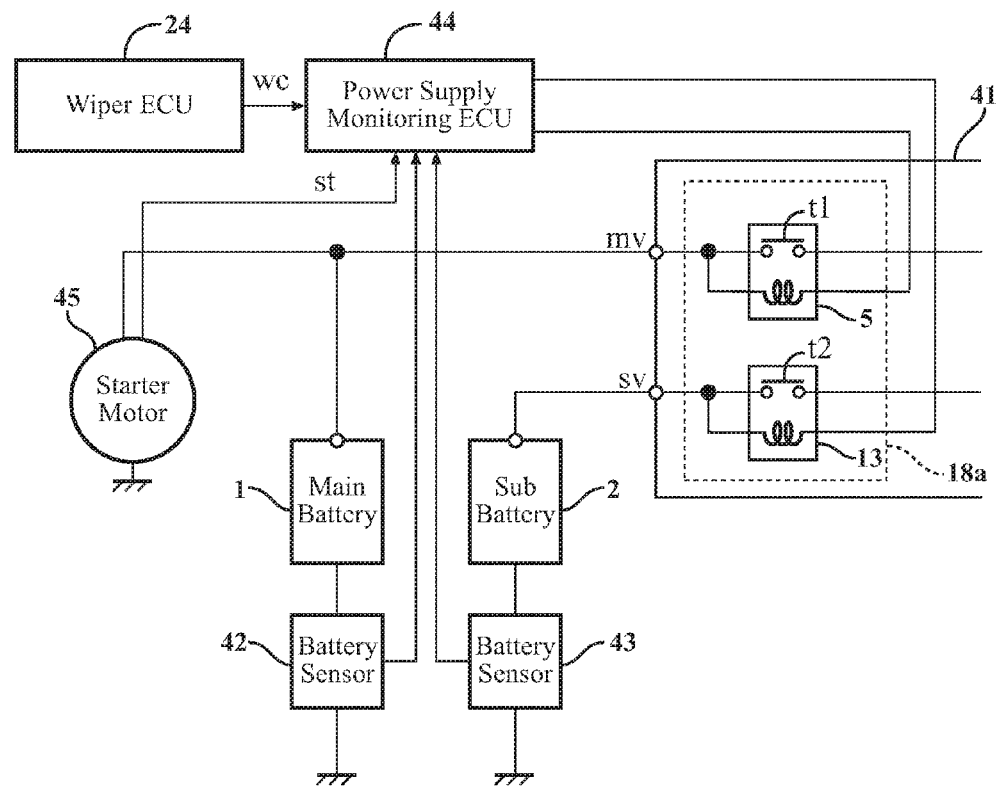
FIG. 10 is a block diagram showing a third embodiment.
Figure 11:
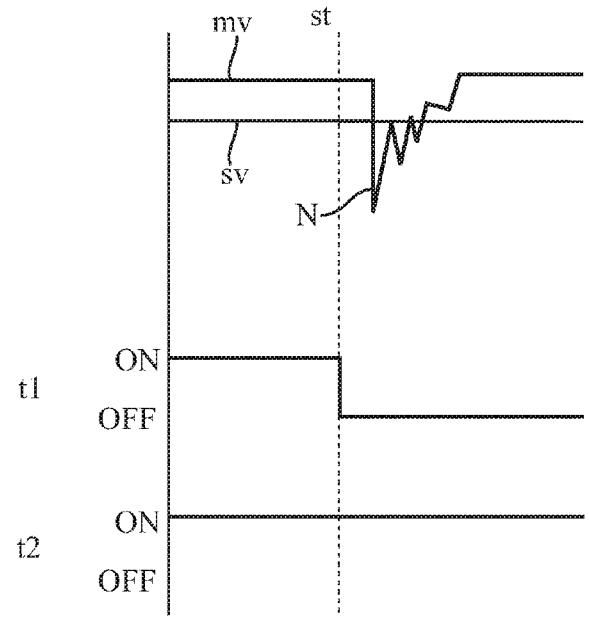
FIG. 11 is a timing chart showing operation according to the third embodiment.
Figure 12:
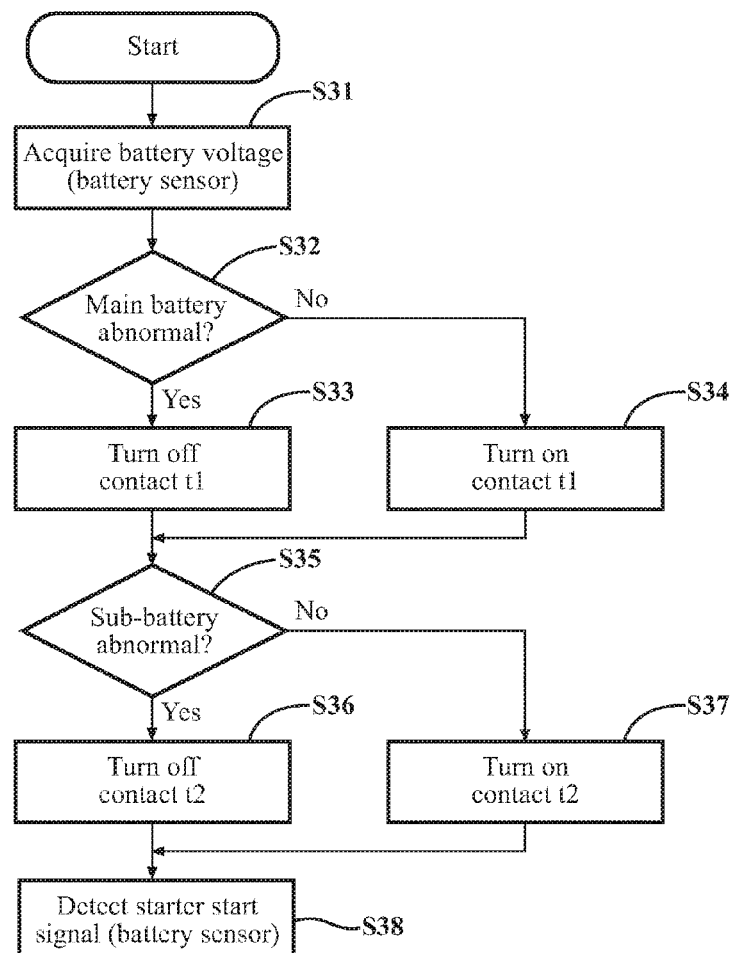
FIG. 12 is a flowchart showing operation according to the third embodiment.

FIGS. 10 to 12 show a third embodiment. This embodiment provides a configuration in which relays (switches) in a power supply box are subjected to open/close control by a power supply monitoring ECU (switch control unit) that is provided outside the power supply box. A description will be given of the power supply monitoring ECU for controlling the opening and closing of the switch means 18*a* that controls the opening and closing of the power supply to the load 7. The same constituent parts as those in the second embodiment will be assigned the same reference numerals, and a detailed description thereof will be omitted.

Battery sensors 42 and 43 that respectively detect the output voltages mv and sv of the main battery 1 and the sub-battery 2 are connected to the respective batteries, and detection signals of these sensors 42 and 43 are input to a power supply monitoring ECU 44, which is provided outside a power supply box 41.

A starter motor 45, to which power is supplied from the main battery 1, outputs a starter start signal st to the power supply monitoring ECU 44 when the starter motor 45 is started.

The power supply monitoring ECU 44 controls the opening and closing of the relays 5 and 13 in the power supply box 41 based on the detection signals output from the battery sensors 42 and 43, the starter start signal st, and a preset program.

The control signal wc is input from the wiper ECU 24 to the power supply monitoring ECU 44. The control signal wc is a signal that is set to a high level when driving the load 7. When the control signal wc is set to a high level, the power supply monitoring ECU 44 controls the opening and closing of the contacts t1 and t2 in the relays 5 and 13 based on the detection signals of the sensors 42 and 43 and the starter start signal st.

If the control signal wc is set to a low level, both the contacts t1 and t2 in the relays 5 and 13 enter a non-conductive state, and the power supply to the load 7 is cut off.

Next, the operation of the power supply monitoring ECU 44 will be described in accordance with FIGS. 11 and 12.

As shown in FIG. 12, the power supply monitoring ECU 44 is monitoring the output voltage mv of the main battery 1 and the output voltage sv of the sub-battery 2 based on the detection signals output from the battery sensors 42 and 43 (steps S31 and S32).

If, in step S32, it is detected that the output voltage mv of the main battery 1 has decreased, the power supply monitoring ECU 44 sets the contact t1 in the relay 5 to a non-conductive state (step S33), and proceeds to step S35.

If, in step S32, it is not detected that the output voltage mv of the main battery 1 has decreased, the power supply monitoring ECU 44 sets the contact t1 in the relay 5 to a conductive state (step S34), and proceeds to step S35.

In step S35, if it is detected that the output voltage sv of the sub-battery 2 has decreased, the power supply monitoring ECU 44 sets the contact t2 in the relay 13 to a non-conductive state (step S36), and proceeds to step S38.

If, in step S35, it is not detected that the output voltage mv of the sub-battery 2 has decreased, the power supply monitoring ECU 44 sets the contact t2 in the relay 13 to a conductive state (step S37), and proceeds to step S38.

Next, in step S38, the input of the starter start signal st is monitored. As shown in FIG. 11, upon the starter start signal st being input (step S39), it is determined whether or not the output voltage sv of the sub-battery 2 is normal (step S40), and if normal, the contact t1 in the relay 5 is set to a non-conductive state (step S41).

If the starter motor 45 operates in this state, as shown in FIG. 11, power supply noise N is generated that is a temporary drop in the output voltage mv of the main battery 1. However, this power supply noise N does not affect the load because the contact t1 is in a non-conductive state.

After the operation of the starter motor 45 ends, the contact t1 is restored to a conductive state.

If, in step S39, the starter start signal st is not input, the contact t1 is kept in a conductive state (step S42). If, in step S40, the output voltage sv of the sub-battery 2 is not normal, the processing proceeds to step S42, and the contact t1 is kept in a conductive state.

Accordingly, when the sub-battery 2 cannot normally supply power when the starter is started, the power supply to the load 7 can be continued by supplying power to the load 7 from the main battery 1.

In the third embodiment, the provision of a functionality similar to that of the power supply monitoring unit according to the second embodiment to the power supply monitoring ECU 44 enables achievement of effects similar to those of the second embodiment, and also enables achievement of the following effects.

Prior to the start of the starter motor 45 to which power is supplied from the main battery 1, the contact t1 in the relay 5 can be set to a non-conductive state. Accordingly, the power supply noise N generated in the output voltage mv of the main battery 1 can be kept from being transmitted to a load due to the operation of the starter motor 45. This configuration is effective in the case of connecting an electronic device that serves as a load and is likely to be affected by power supply noise.

If the sub-battery 2 cannot normally supply power, the contact t1 in the relay 5 can also be kept in a conductive state when the starter motor 45 is started. Accordingly, the power supply to a load can be prevented from being cut off when the starter motor 45 is started.

Fourth Embodiment

A fourth embodiment of the automotive power unit will be described below in accordance with FIG. 14. A main battery 101 and a sub-battery 102 are connected to a power supply box 103. In the power supply box 103, diodes (current control units) 104 and 105 and a fuse 106 are provided, the output power of the main battery 101 is supplied to the anode of the diode 104, and the output power of the sub-battery 102 is supplied to the anode of the diode 105.

The cathodes of the diodes 104 and 105 are connected to an end of the common fuse 106, and the other end of this fuse 106 is connected to a load (e.g. ECU) 108 via a power source line 107, which extends to the outside of the power supply box 103. One load 108 is supplied with power using one power source line 107. If power is supplied to a plurality of loads from the power supply box 103, the power source line 107 is branched, and each load is supplied with power using one power source line. Note that the load 108 in the fourth embodiment is a load that consumes little power and has a small power capacity.

The main battery 101 and the sub-battery 102 are charged by power being supplied from an alternator (not shown) during a regenerative operation, for example.

Next, the operation of the power unit having the above-described configuration will be described.

In a state where the main battery 101 and the sub-battery 102 have been normally charged and output roughly the same voltage, the load 108 is supplied with power from at least one of the main battery 101 and the sub-battery 102 via the diodes 104 and 105 and the fuse 106.

For example, if the output voltage of the main battery 101 has decreased in a state where the sub-battery 102 has been normally charged, or if the main battery 101 has failed, the load 108 is supplied with power from the sub-battery 102 via the diode 105 and the fuse 106.

At this time, the operation of the diode 104 keeps a current from flowing into the main battery 101 from the sub-battery 102, and therefore, the sub-battery 102 will not fail together with the main battery 101.

Similarly, if the output voltage of the sub-battery 102 has decreased in a state where the main battery 101 has been normally charged, or if the sub-battery 102 has failed, the load 108 is supplied with power from the main battery 101 via the diode 104 and the fuse 106.

At this time, the operation of the diode 105 keeps a current from flowing into the sub-battery 102 from the main battery 101, and therefore, the main battery 101 will not fail together with the sub-battery 102.

The automotive power unit according to the fourth embodiment can achieve the following effects.

If the output voltage of one of the main battery 101 and the sub-battery 102 has decreased, or one of the main battery 101 and the sub-battery 102 has failed, the load 108 can be supplied with power from the other battery. Accordingly, it is possible to achieve redundancy of the power supply, and stably supply necessary power to the load 108.

Power can be supplied from the power supply box 103 to the load 108 using one power source line 107. The number of power source lines 107 can be reduced, which contributes to a reduction in the vehicle weight of the automobile and enables cost reduction.

The operation of the diodes 104 and 105 can keep a current from flowing between the main battery 101 and the sub-battery 102. Accordingly, if one of the batteries has failed, or if the output voltage thereof has decreased, it is possible to keep unnecessary discharge of the other battery and protect this battery.

Fifth Embodiment

Figure 15:
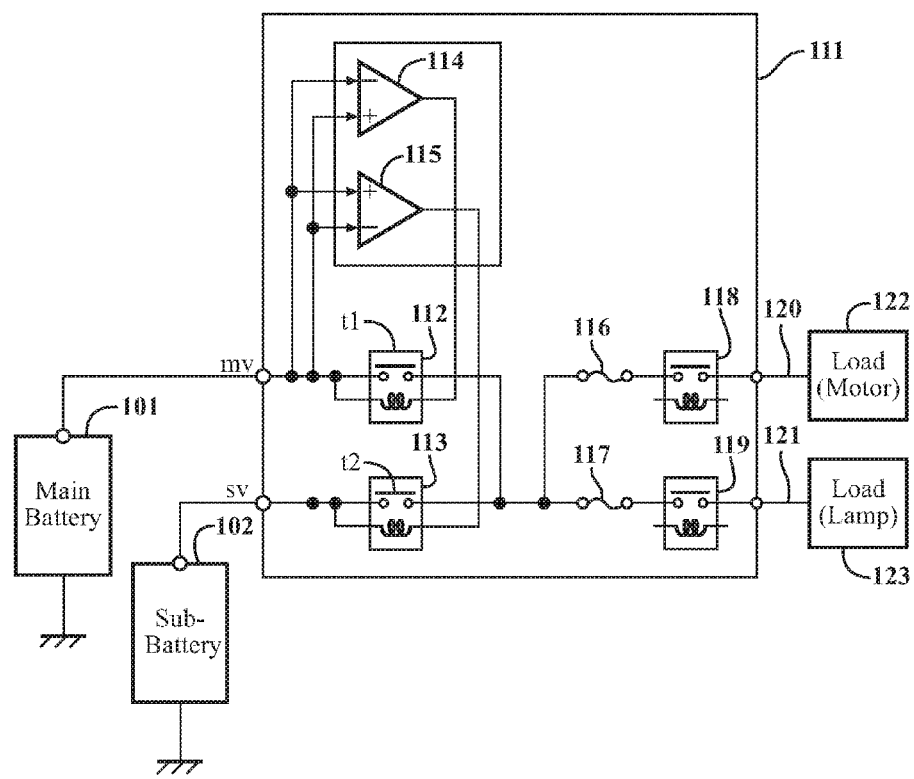
FIG. 15 is a block diagram showing a fifth embodiment.

A fifth embodiment shown in FIG. 15 uses relays in place of the diodes in the fourth embodiment.

In a power supply box 111, relays 112 and 113 and comparators 114 and 115 are provided. The main battery 101 is connected to one terminal of a contact t1 in the relay 112, and the sub-battery 102 is connected to one terminal of a contact t2 in the relay 113.

The output voltage mv of the main battery 101 and the output voltage sv of the sub-battery 102 are input to the comparators 114 and 115, respectively.

The comparator 114 compares the output voltages mv and sv of the main battery 101 and the sub-battery 102, and outputs a high-level output signal when the output voltage mv of the main battery 101 is lower than the output voltage sv of the sub-battery 102, thereby operating so as to cause an excitation current to flow through the coil in the relay 112.

Control is performed in the relay 112 such that, upon the excitation current flowing through the coil, the contact t1 in the relay 112 enters a non-conductive state.

The comparator 115 compares the output voltages mv and sv of the main battery 101 and the sub-battery 102, and outputs a high-level output signal when the output voltage sv of the sub-battery 102 is lower than the output voltage mv of the main battery 101, thereby operating so as to cause an excitation current to flow through the coil in the relay 113.

Control is performed in the relay 113 such that, upon the excitation current flowing through the coil, the contact t2 in the relay 113 enters a non-conductive state.

Note that one of the relays 112 and 113 enters a conductive state as a result of the operation of the comparators 114 and 115 that is based on the output voltages mv and sv of the main battery 101 and the sub-battery 102. When the output voltages mv and sv of the main battery 101 and the sub-battery 102 are roughly the same, filter means for absorbing a change in the voltage of the batteries 101 and 102 in a short cycle may be connected to input terminals of the comparators 114 and 115 such that the switching operation of the relays 112 and 113 is not frequently repeated.

The comparators 114 and 115 need to include an output circuit that enable a supply of a sufficient excitation current for the coils in the relays 112 and 113.

The other terminals of the contacts t1 and t2 in the relays 112 and 113 are connected to each other and are also connected to one ends of the fuses 116 and 117.

The other end of the fuse 116 is connected to a load (e.g. wiper motor) 122 via a contact in a load relay 118 and a power source line 120. The other end of the fuse 117 is connected to a load (lamp) 123 via a contact in a load relay 119 and a power source line 121. The motor 122 and the lamp 123 are loads having a large power capacity. The load relays 118 and 119 are relays that are opened and closed based on a driver's operation.

Next, the operation of the power unit having the above-described configuration will be described.

In a state where the main battery 101 and the sub-battery 102 have been normally charged and output roughly the same voltage, one of the contacts t1 and t2 in the relays 112 and 113 are in a conductive state. Then, the loads 122 and 123 can be supplied with power from one of the main battery 101 and the sub-battery 102 via the fuses 116 and 117 and the load relays 118 and 119.

For example, if the main battery 101 has entered a grounded state and the output voltage mv has significantly decreased compared with the output voltage sv of the sub-battery 102 (see FIG. 3), the contact in the relay 112 enters a non-conductive state due to the operation of the comparators 114 and 115, and the contact t2 in the relay 113 enters a conductive state.

In this state, the loads 122 and 123 can be supplied with power from the sub-battery 102 via the relay 113, the fuses 116 and 117, and the load relays 118 and 119. Since the contact t1 in the relay 112 enters a non-conductive state, a current is prevented from flowing from the sub-battery 102 to the main battery 101, and the sub-battery 102 is protected.

On the other hand, if the sub-battery 102 has entered a grounded state and the output voltage sv has decreased, the contact t2 in the relay 113 enters a non-conductive state due to the operation of the comparators 114 and 115, and the contact t1 in the relay 112 enters a conductive state.

In this state, the loads 122 and 123 can be supplied with power from the main battery 101 via the relay 112, the fuses 116 and 117, and the load relays 118 and 119. Since the contact t2 in the relay 113 enters a non-conductive state, a current is prevented from flowing from the main battery 101 to the sub-battery 102, and the main battery 101 is protected.

The automotive power unit according to the fifth embodiment can achieve the following effects.

If the output voltage of one of the main battery 101 and the sub-battery 102 has decreased, or one of the main battery 101 and the sub-battery 102 has failed, the loads 122 and 123 can be supplied with power from the other battery. Accordingly, it is possible to achieve redundancy of the power supply, and stably supply necessary power to the loads.

Power can be supplied from the power supply box 111 to each of the loads 122 and 123 using a corresponding one of the power source lines 120 and 121. Accordingly, the number of power source lines 120 and 121 can be reduced, which contributes to a reduction in the vehicle weight of the automobile and enables cost reduction.

With the relays 112 and 113 that are opened and closed based on the operation of the comparators 114 and 115, a current can be kept from flowing between the main battery 101 and the sub-battery 102. Accordingly, if one of the batteries has failed, or if the output voltage of one of the batteries has decreased, it is possible to keep unnecessary discharge of the other battery and protect this battery.

Since a sufficient power capacity can be readily ensured for the contacts t1 and t2 in the relays 112 and 113, the number of power source lines 120 and 121 can be reduced while achieving redundancy of the power supply for the loads 122 and 123, such as a motor and a lamp, that require the supply of a large current.

Sixth Embodiment

Figure 16:
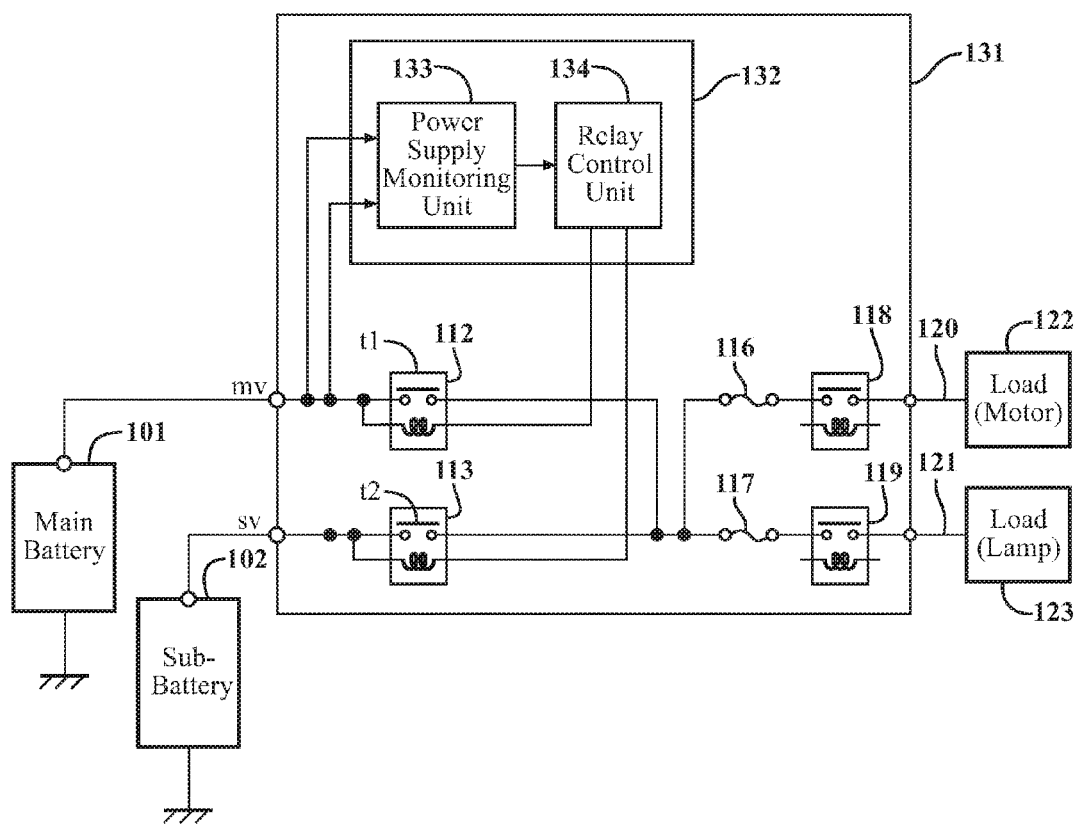
FIG. 16 is a block diagram showing a sixth embodiment.

A sixth embodiment shown in FIG. 16 provides a configuration in which the relays 112 and 113 are subjected to open/close control by a microcomputer in place of the comparators 114 and 115 in the fifth embodiment. The same constituent parts as those in the fifth embodiment will be assigned the same reference numerals, and a detailed description thereof will be omitted.

As shown in FIG. 16, a microcomputer 132 is provided in the power supply box 131, and a power supply monitoring unit 133 and a relay control unit 134 are provided in this microcomputer 132. The relay control unit 134 may also be called a drive unit.

The output voltage mv of the main battery 101 and the output voltage sv of the sub-battery 102 are input to the power supply monitoring unit 133. The power supply monitoring unit 133 drives the relay control unit 134 based on the output voltages mv and sv, supplies an excitation current to the coils in the relays 112 and 113, and performs control such that one of or both the contacts t1 and t2 in the relays 112 and 113 enter a conductive state.

The power supply monitoring unit 133 is provided with a plurality of programs for controlling the opening and closing of the relays 112 and 113, and can control open/close operation of the relays 112 and 113 with one of these programs selected. The power supply monitoring unit 133 and the relay control unit 134 can perform the first to third open/close control that has been described in FIGS. 7 to 9.

In the sixth embodiment, the contact in a relay connected to one of the main battery 101 and the sub-battery 102 (e.g. the sub-battery 102) that has a lower output voltage than the threshold voltage vt enters a non-conductive state. Therefore, a current is kept from flowing from the normal battery (e.g. the main battery 101) to a battery in an abnormal state (e.g. the sub-battery 102).

The automotive power unit according to the sixth embodiment can achieve the following effects in addition to some effects of the fifth embodiment.

With the relays 112 and 113 that are opened and closed based on the operation of the power supply monitoring unit 133, a current can be kept from flowing between the main battery 101 and the sub-battery 102. Accordingly, if one of the batteries has failed, or if the output voltage of one of the batteries has decreased, it is possible to keep unnecessary discharge of the other battery and protect this battery.

In the second open/close control, when the output voltage mv of the main battery 101 and the output voltage sv of the sub-battery have decreased compared with the threshold voltage vt, i.e. when voltage abnormality has occurred, the contacts t1 and t2 in the relays 112 and 113 are made non-conductive. Accordingly, if both the output voltage mv of the main battery 101 and the output voltage sv of the sub-battery 102 are higher than the threshold voltage vt, the contacts t1 and t2 are set to a conductive state, and the loads can be supplied with power from the main battery 101 and the sub-battery 102.

In the third open/close control, the opening and closing of the contacts t1 and t2 in the relays 112 and 113 is controlled based on the difference vd between the output voltage mv of the main battery 101 and the output voltage sv of the sub-battery 102. Accordingly, even if both the output voltage mv of the main battery 101 and the output voltage sv of the sub-battery 102 have decreased, the loads can be supplied with power from the main battery 101 and the sub-battery 102 unless the difference vd therebetween exceeds the threshold value vdt. Furthermore, even if both the output voltage mv of the main battery 101 and the output voltage sv of the sub-battery 102 have decreased and the difference vd exceeds the threshold value vdt, the loads can be supplied with power from one of the batteries that has a higher output voltage.

Seventh Embodiment

Figure 17:
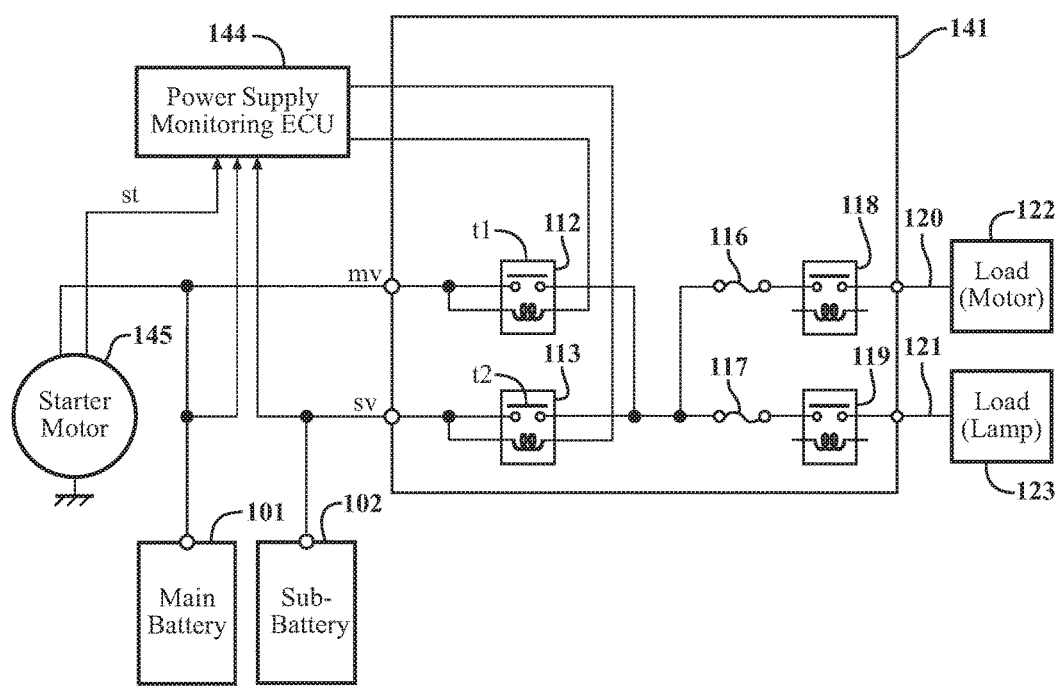
FIG. 17 is a block diagram showing a seventh embodiment.

A seventh embodiment shown in FIG. 17 provides a configuration in which a relay in a power supply box is subjected to open/close control by a power supply monitoring ECU that is provided outside the power supply box. The same constituent parts as those in the sixth embodiment will be assigned the same reference numerals, and a detailed description thereof will be omitted.

The output voltages mv and sv of the main battery 101 and the sub-battery 102 are input to the power supply monitoring ECU 144 that is provided outside the power supply box 141.

A starter motor 145, to which power is supplied from the main battery 101, outputs a starter start signal st to the power supply monitoring ECU 144 when the starter motor 145 is started.

The power supply monitoring ECU 144 controls the opening and closing of the relays 112 and 113 in the power supply box 141 based on the output voltages mv and sv of the main battery 101 and the sub-battery 102, the starter start signal st, and a preset program.

The power supply monitoring ECU 144 can operate in a manner similar to that in FIGS. 11 and 12.

In the automotive power unit according to the seventh embodiment, provision of a functionality similar to that of the power supply monitoring unit according to the sixth embodiment to the power supply monitoring ECU 144 enables achievement of effects similar to those of the sixth embodiment, and also enables achievement of the following effects.

Prior to the start of the starter motor 145 to which power is supplied from the main battery 101, the contact t1 in the relay 112 can be set to a non-conductive state. Accordingly, the power supply noise N generated in the output voltage mv of the main battery 101 due to the operation of the starter motor 145 can be prevented from being transmitted to the loads. This configuration is effective in the case of connecting electronic devices that serve as loads and are likely to be affected by power supply noise.

If the sub-battery 102 cannot normally supply power, the contact t1 in the relay 112 can be kept in a conductive state even when the starter motor 145 is started. Accordingly, the power supply to the loads can be prevented from being cut off when the starter motor 145 is started.

In the fourth to seventh embodiments, the main battery 101 and the sub-battery 102 may be storage batteries. The diodes 104 and 105, the relays 112 and 113, the comparators 114 and 115, the microcomputer 132 (the power supply monitoring unit 133 and the relay control unit 134), and the power supply monitoring ECU 144 are favorable specific examples of a current control means or a current control circuit. The relays 112 and 113 are favorable examples of a switch. The comparators 114 and 115, the microcomputer 132 (the power supply monitoring unit 133 and the relay control unit 134), and the power supply monitoring ECU 144 each can function as a switch control unit.

Eighth Embodiment

An eighth embodiment of the automotive power unit will be described below in accordance with FIG. 18. A first storage battery 201 is connected to a junction box 203 via a fuse 202, and a second storage battery 204 is connected to a junction box 206 via a fuse 205. In the shown example, the first storage battery 201 is constituted by a lead storage battery, and the second storage battery 204 is constituted by a capacitor. The junction boxes 203 and 206 may be power supply boxes, for example.

A relay 207 and a large number of fuses 215a to 215c are provided in the junction box 203, and a contact 208 in the relay 207 is arranged between the fuse 202 and terminal of the fuses 215a to 215c on one side. The contact 208 and the fuses 215a to 215c are connected by a bus bar. One end of a coil 209 that electromagnetically drives the contact 208 in the relay 207 is connected to the fuse 202 via a resistor 210.

A relay 211 and a plurality of fuses 216a and 216b are provided in the junction box 206, and a contact 212 in the relay 211 is arranged between the fuse 205 and terminals of the fuses 216a and 216b on one side. The contact 212 and the fuses 216a and 216b are connected by a bus bar. One end of a coil 213 that electromagnetically drives the contact 212 in the relay 211 is connected to the fuse 205 via a resistor 214.

A terminal of the contact 208 on the fuses 215a to 215c side in the junction box 203 is connected to the other terminal of the coil 213 via a fuse 217 and a diode 218. The diode 218 is connected with its cathode on the coil 213 side.

Similarly, a terminal of the contact 212 on the fuses 216a and 216b side in the junction box 206 is connected to the other terminal of the coil 209 via a fuse 219 and a diode 220. The diode 220 is connected with its cathode on the coil 209 side.

The relays 207 and 211 have a normally closed contact that enters a non-conductive state as a result of the contacts 208 and 212 opening when an excitation current flows through the coils 209 and 213. If the first storage battery 201 has entered a short-circuit state, an excitation current flows through the coil 209 from the second storage battery 204 via the fuse 205, the contact 212, the fuse 219, and the diode 220, and the contact 208 is opened.

If the second storage battery 204 has entered a short-circuit state, an excitation current flows through the coil 213 from the first storage battery 201 via the fuse 202, the contact 208, the fuse 217, and the diode 218, and the contact 212 is opened.

With this configuration, the relay 207, the resistor 210, the fuse 219, and the diode 220 constitute a separation device 221 that disconnects the first storage battery 201 and the fuses 215a to 215c when the first storage battery 201 has entered a short-circuit state.

Similarly, the relay 211, the resistor 214 and the fuse 217 in the junction box 206, as well as the diode 218 constitute a separation device 222 that disconnects the second storage battery 204 and the fuses 216a and 216b when the second storage battery 204 has entered a short-circuit state.

An alternator 223 is connected to the other end of the fuse 215a. Upon the alternator 223 operating in a state where the first storage battery 201 is operating normally, the power generated by the alternator 223 is supplied to the first storage battery 201 via the fuse 215a, the contact 208, and the fuse 202, and the first storage battery 201 is charged.

Similarly, upon the alternator 223 operating in a state where the second storage battery 204 is operating normally, the power generated by the alternator 223 is supplied to the second storage battery 204 via the fuse 215a, the fuse 215b, a relay 226, the fuse 216a, the contact 212, and the fuse 205, and the second storage battery 204 is charged.

A contact in the relay 226 is arranged between the fuse 215b in the junction box 203 and the fuse 216a in the junction box 206. The relay 226 is controlled such that the contact thereof is set to a conductive state by a power supply control ECU when one of the first storage battery 201 and the second storage battery 204 has failed, or in accordance with a charging state of the first storage battery 201 and the second storage battery 204.

A first load group 224 is connected to the other end of the fuse 215c in the junction box 203, and a second load group 225 is connected to the other end of the fuse 216b in the junction box 206. If both the first storage battery 201 and the second storage battery 204 are operating normally and the contact in the relay 226 is in a non-conductive state, the first load group 224 is supplied with power from the first storage battery 201, and the second load group 225 is supplied with power from the second storage battery 204.

On the other hand, if the first storage battery 201 has failed and the contact in the relay 226 has entered a conductive state, the first load group 224 is supplied with power from the second storage battery 204 via the fuse 216a, the contact in the relay 226, and the fuses 215b and 215c.

Similarly, if the second storage battery 204 has failed and the contact in the relay 226 has entered a conductive state, the second load group 225 is supplied with power from the first storage battery 201 via the fuse 215b, the contact in the relay 226, and the fuses 216a and 216b. With this operation, the relay 226 operates to serve as a redundant power supply device.

Next, the operation of the power unit having the above-described configuration will be described.

If the first and second storage batteries 201 and 204 are operating normally, the output voltages of the first and second storage batteries 201 and 204 are roughly the same voltages, and therefore, an excitation current does not flow through the coils 209 and 213 in the relays 207 and 211.

Then, the contacts 208 and 212 in the relays 207 and 211 are kept in a conductive state, the first load group 224 is supplied with power from the first storage battery 201, and the second load group 225 is supplied with power from the second storage battery 204.

At this time, if the contact in the relay 226 is in a conductive state, the second load group 225 is also supplied with power from the first storage battery 201, and the first load group 224 is also supplied with power from the second storage battery 204.

Note that, even if a small voltage is generated in the output voltages of the first storage battery 201 and the second storage battery 204, a current flowing through the coils 209 and 213 is suppressed by the resistors 210 and 214, and therefore, the contacts 208 and 212 are kept in a conductive state.

If the first storage battery 201 has entered a short-circuit state and failed, the contact in the relay 226 is kept in a conductive state by the power supply control ECU. Also, an excitation current flows through the coil 209 from the second storage battery 204 via the contact 212 and the diode 220, and the contact 208 enters a non-conductive state.

Then, the current flowing through the first storage battery 201 from the second storage battery 204 via the fuse 216a, the contact in the relay 226, the fuse 215b, and the contact 208 is cut off, and the first storage battery 201 is electrically separated from the second storage battery 204.

As a result, a short-circuit current flowing from the second storage battery 204 to the first storage battery 201 is cut off, and the second storage battery 204 is protected. The first load group 224 and the second load group 225 are supplied with power from the second storage battery 204.

On the other hand, if the second storage battery 204 has entered a short-circuit state and failed, the contact in the relay 226 is kept in a conductive state by the power supply control ECU. Also, an excitation current flows through the coil 213 from the first storage battery 201 via the contact 208 and the diode 218, and the contact 212 enters a non-conductive state.

Then, the current flowing from the first storage battery 201 to the second storage battery 204 via the fuse 215b, the contact in the relay 226, the fuse 216a, and the contact 212 is cut off, and the second storage battery 204 is electrically separated from the first storage battery 201.

As a result, a short-circuit current flowing from the first storage battery 201 into the second storage battery 204 is cut off, and the first storage battery 201 is protected. The first load group 224 and the second load group 225 are supplied with power from the first storage battery 201.

The power unit according to the eighth embodiment can achieve the following effects.

When one of the first storage battery 201 and the second storage battery 204 has made a short circuit, the separation devices 221 and 222 that open the contacts provided between the one of the storage batteries and the other storage battery are arranged respectively between the relay 226 and the first storage battery 201 and between the relay 226 and the second storage battery 204. When one of the first storage battery 201 and the second storage battery 204 has entered a short-circuit state and failed, the failed storage battery is electrically separated from the normally-operating storage battery. A short-circuit current flowing from the normally-operating storage battery to the failed storage battery can be cut off. Accordingly, the normally-operating storage battery can be protected.

If one of the first storage battery 201 and the second storage battery 204 has entered a short-circuit state and failed, the first load group 224 and the second load group 225 can be supplied with power from the normally-operating storage battery.

In the case where one of the first storage battery 201 and the second storage battery 204 is a lead storage battery and the other is a capacitor, if the capacitor itself has entered a short-circuit state, the lead storage battery also enters a grounded state via the capacitor. Therefore, there is a possibility that both the capacitor and the lead storage battery will fail. In a reference example of a configuration in which a diode is arranged between the capacitor and the loads and a current flowing from the lead storage battery to the capacitor when the capacitor is grounded is cut off, the capacitor that has entered the short-circuit state is separated from the lead storage battery by the diode. However, a voltage loss occurs due to a forward voltage drop in the diode arranged between the capacitor and the loads during normal operation. In this regard, in the eighth embodiment, a diode is not arranged on a path for supplying power to the first load group 224 and the second load group 225 from the first storage battery 201 and the second storage battery 204. Accordingly, the voltage loss due to a diode can be prevented.

By using the relays 207 and 211 having a normally closed contact, an excitation current can be caused to flow through the coils 209 and 213 in the relays 207 and 211 only when the first storage battery 201 or the second storage battery 204 has failed. Accordingly, the relays 207 and 211 can be configured to not consume power when the first and second storage batteries 201 and 204 are operating normally.

Ninth Embodiment

Figure 19:
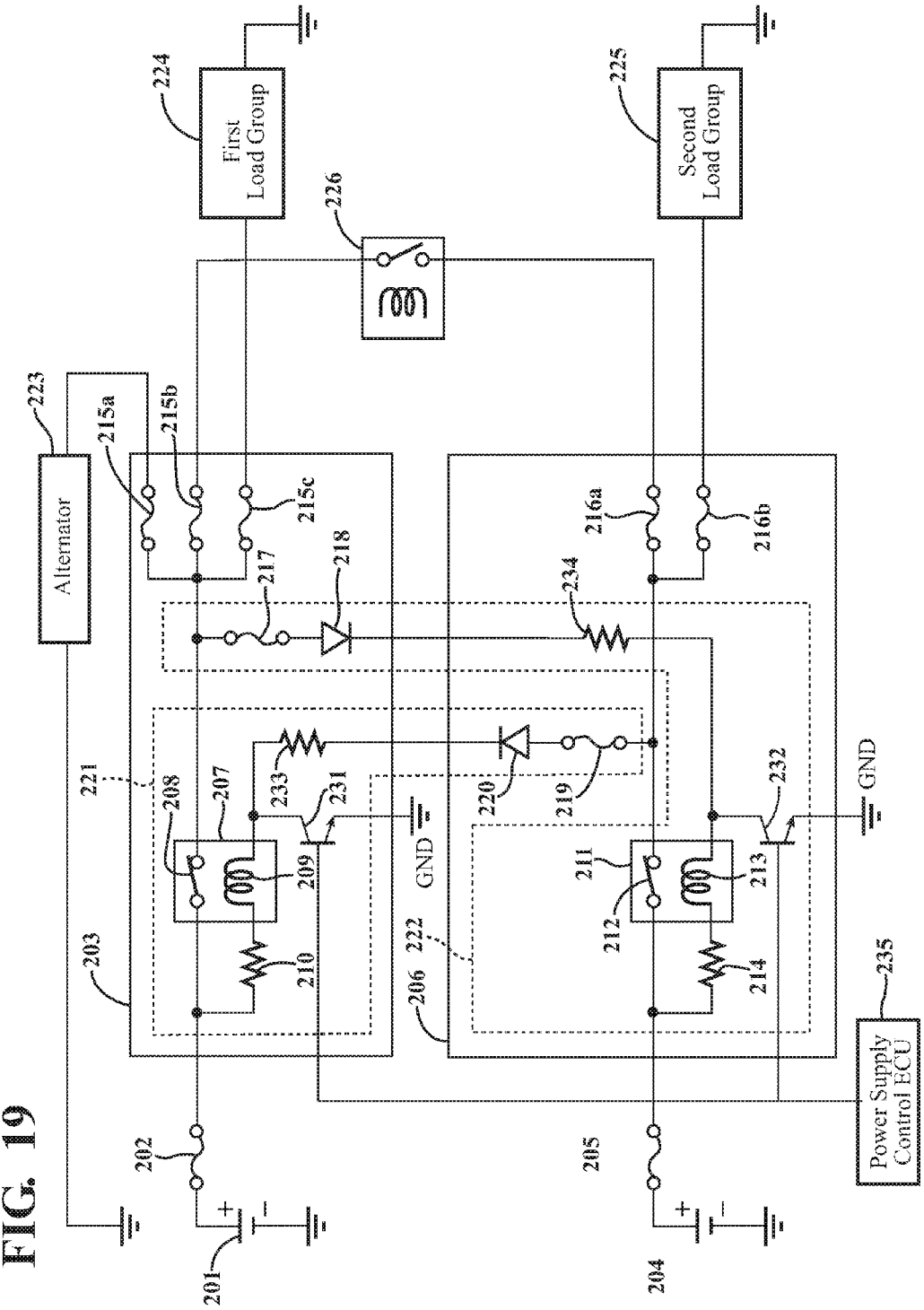
FIG. 19 is a circuit diagram showing a ninth embodiment.

A ninth embodiment shown in FIG. 19 includes transistors 231 and 232 and resistors 233 and 234 in the junction boxes 203 and 206 in the eighth embodiment. The remaining configuration is similar to that of the eighth embodiment. The same constituent parts as those in the eighth embodiment will be assigned the same reference numerals, and a detailed description thereof will be omitted.

The transistors 231 and 232 are constituted by NPN transistors. The collector of the transistor 231 is connected between the coil 209 and the diode 220, and the collector of the transistor 232 is connected between the coil 213 and the diode 218.

The bases of the transistors 231 and 232 are connected to a power supply control ECU 235, and the emitters thereof are connected to ground GND.

In the power unit having the above-described configuration, if, in a state where the first storage battery 201 and the second storage battery 204 are operating normally, one of the transistors 231 and 232 is turned on by a separation signal that is output from the power supply control ECU 235, an excitation current flows through the coil 209 or the coil 213, and the contact 208 or the contact 212 enters a non-conductive state.

As a result, it is possible to forcibly separate the first storage battery 201 and the second storage battery 204 from each other, and supply power to the first load group 224 and the second load group 225 from one of the storage batteries.

Accordingly, in this embodiment, in addition to the effects achieved by the eighth embodiment, the opening and closing of the relays 207 and 211 can be controlled by the power supply control ECU 235 regardless of whether or not the first storage battery 201 and the second storage battery 204 has failed.

With this configuration, charging control for the first storage battery 201 and the second storage battery 204 can be performed by controlling the opening and closing of the relays 207 and 211. The transistors 231 and 232 are favorable specific examples of a forcible separation device.

Tenth Embodiment

Figure 20:
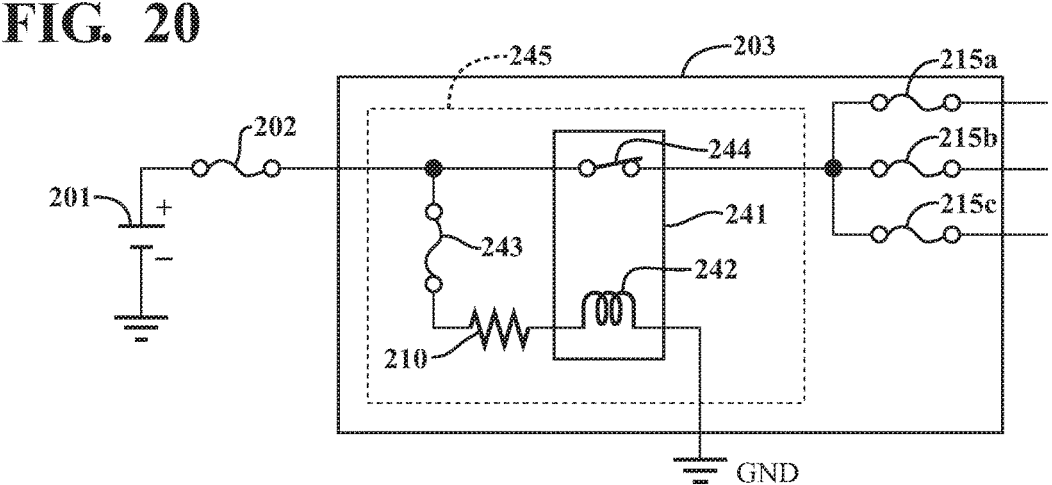
FIG. 20 is a circuit diagram showing a tenth embodiment.
Figure 21:
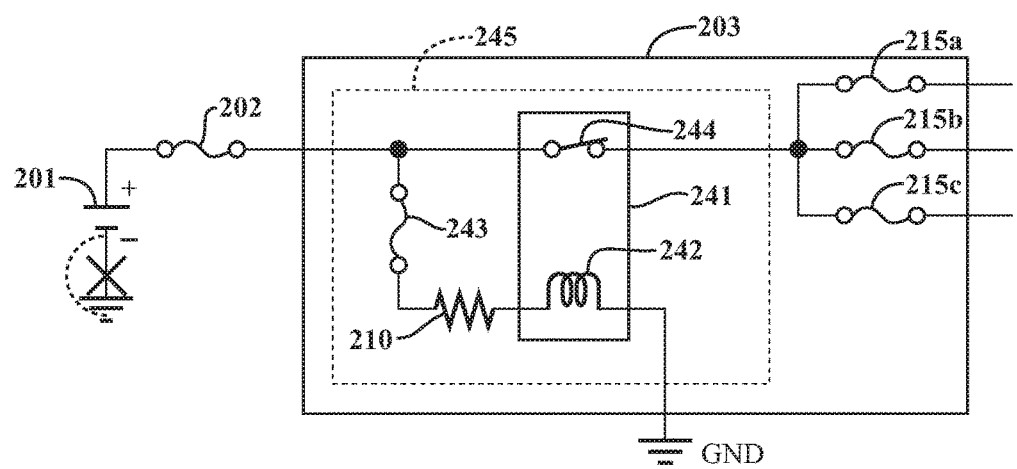
FIG. 21 is a circuit diagram showing the tenth embodiment.

FIGS. 20 and 21 show a tenth embodiment. The eighth and ninth embodiments provide a configuration in which the coil 209 in the relay 207 for separating the first storage battery 201 from the second storage battery 204 is supplied with an excitation current from the second storage battery 204, and the coil 213 in the relay 211 that separates the second storage battery 204 from the first storage battery 201 is supplied with an excitation current from the first storage battery 201.

The tenth embodiment provides a configuration in which a coil 242 in a relay 241, which constitutes a separation device 245 for separating the first storage battery 201 from the second storage battery 204, is supplied with an excitation current from the first storage battery 201, and a coil in a relay that separates the second storage battery 204 from the first storage battery 201 is supplied with an excitation current from the second storage battery 204.

FIGS. 20 and 21 show only the junction box 203 connected to the first storage battery 201, and the same constituent parts as those in the eighth embodiment will be described with the same reference numerals assigned thereto. The junction box 206 connected to the second storage battery 204 also has a similar configuration.

As shown in FIG. 20, one end of the coil 242 in the relay 241 in the junction box 203 is connected to the first storage battery 201 via the resistor 210, a fuse 243, and the fuse 202, and the other end of the coil 242 is connected to the ground GND. The remaining is similar to that in the eighth embodiment. The relay 241 has a normally open contact structure in which the contact 244 enters a conductive state when an excitation current flows through the coil 242.

In the power unit having the above-described configuration, as shown in FIG. 20, an excitation current is supplied to the coil 242 in the relay 241 from the first storage battery 201 when in a normal state, and the contact 244 is kept in a conductive state.

If the first storage battery 201 has entered a short-circuit state and failed, the supply of the excitation current to the coil 242 is cut off. Then, as shown in FIG. 21, the contact 244 is opened, and the first storage battery 201 is electrically separated from the second storage battery 204.

Accordingly, an inflow of a short-circuit current from the second storage battery 204 to the first storage battery 201 is kept, and therefore, the second storage battery 204 can be protected. Even if the second storage battery 204 has entered a short-circuit state, the first storage battery 201 can be protected with a similar operation.

Eleventh Embodiment

Figure 22:
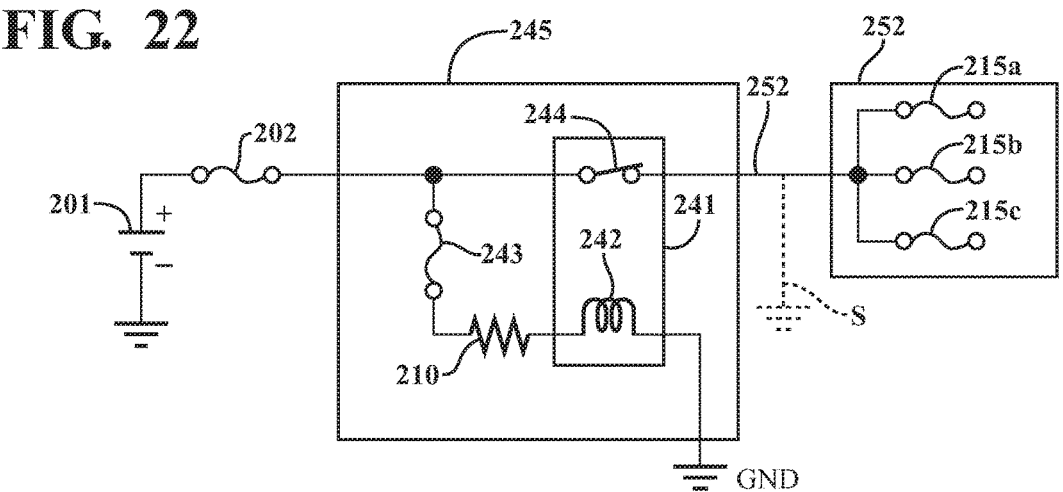
FIG. 22 is a circuit diagram showing an eleventh embodiment.
Figure 23:
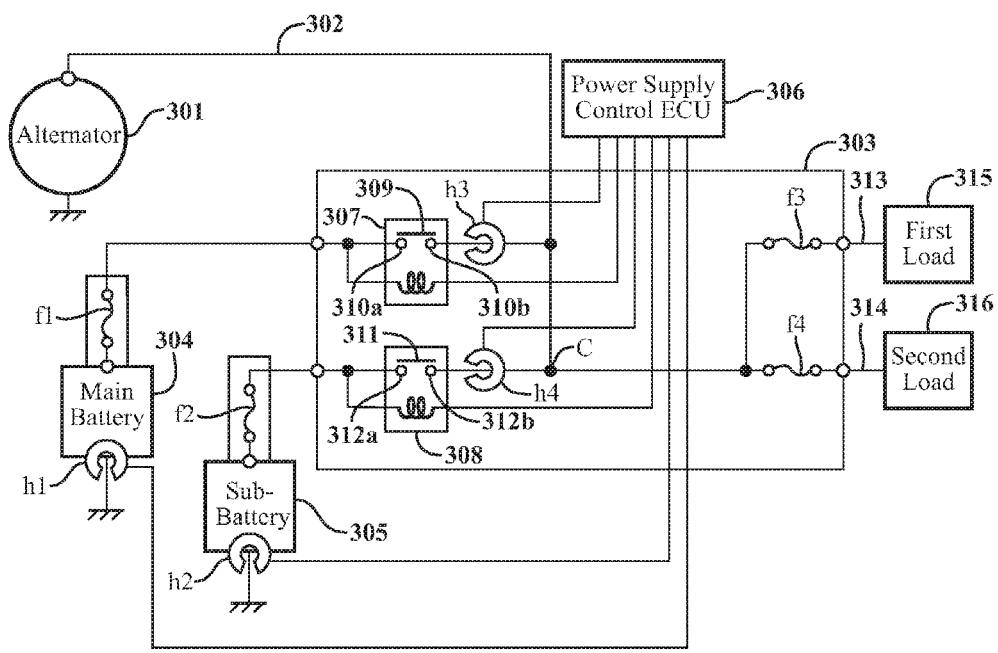
FIG. 23 is a block diagram showing a twelfth embodiment.

FIG. 22 shows an eleventh embodiment. In this embodiment, the separation device 245 having a configuration similar to that in the tenth embodiment and a fusible link 252, which houses fuses 215a to 215c, are connected by a wire harness 253. The remaining configuration is similar to that in the tenth embodiment.

With this configuration, when the first storage battery 201 has entered a short-circuit state, operation similar to that in the tenth embodiment is performed. When a ground fault S occurs on the wire harness 253, the fuse 202 and the fuse 215b are cut off. Therefore, the first storage battery and the second storage battery 204 can be protected.

Twelfth Embodiment

FIGS. 23 to 26 show a twelfth embodiment of the automotive power unit. An alternator 301 generates power based on the rotation of an output shaft of an engine during a regenerative operation or during normal driving, and the generated power is supplied to a power supply box 303 via one power supply line 302.

The output power of a main battery 304 is supplied to the power supply box 303 via a fuse f1, and the output power of a sub-battery 305 is supplied to the power supply box 303 via a fuse f2.

A Hall element h1 is attached to a ground line that is connected to the main battery 304, enabling detection of the direction and the current value of a current output from the main battery 304 and a current supplied to the main battery 304.

Similarly, a Hall element h2 is attached to a ground line that is connected to the sub-battery 305, enabling detection of the current value and the direction of a current output from the sub-battery 305 and a current supplied to the sub-battery 305. Detection signals of the Hall elements h1 and h2 are output to a power supply control ECU 306.

Relays 307 and 308 are provided in the power supply box 303. One terminal (input terminal) 310a of a contact 309 in the relay 307 is supplied with the output power from the main battery 304, and one terminal (input terminal) 312a of a contact 311 in the relay 308 is supplied with the output power from the sub-battery 305. The relays 307 and 308 form at least a part of a switch means or switch circuitry.

Lines connected to the other terminals (output terminals) 310b and 312b of the contacts 309 and 311 are connected to each other at a node C, and are also connected to a first load 315 via a fuse f3 and a power source supply line 313 provided outside of the power supply box 303 and to a second load 316 via a fuse f4 and a power source supply line 314 provided outside the power supply box 303.

Hall elements h3 and h4 are attached respectively to a line between the other terminal 310b of the contact 309 and the node C and to a line between the other terminal 312b of the contact 311 and the node C, enabling detection of the current value and the direction of a current flowing through the contacts 309 and 311. Detection signals of the Hall elements h3 and h4 are output to a power supply control ECU 306.

The power supply line 302 is connected to the node C. The generated power of the alternator 301 can be supplied to the main battery 304 via the contact 309, and can be supplied to the sub-battery 305 via the contact 311.

Also, the generated power of the alternator 301 is supplied to the first load 315 via the fuse f3 and the power source supply line 313, and is supplied to the second load 316 via the fuse f4 and the power source supply line 314.

The power supply control ECU 306 controls the opening and closing of the contacts 309 and 311 by determining whether or not to supply an excitation current to coils in the relays 307 and 308 based on the current value and the current direction detected by the Hall elements h1 to h4.

Specifically, the contact 309 in the relay 307 is set to a non-conductive state if the current value detected by the Hall element h1 is sufficiently smaller than the current value detected by the Hall element h3, and the current direction detected by the Hall element h3 is different from the current direction detected by the Hall element h4.

Similarly, the contact 311 in the relay 308 is set to a non-conductive state if the current value detected by the Hall element h2 is sufficiently smaller than the current value detected by the Hall element h4, and the current direction detected by the Hall element h3 is different from the current direction detected by the Hall element h4.

Next, the operation of the power unit having the above-described configuration will be described.

Figure 24:
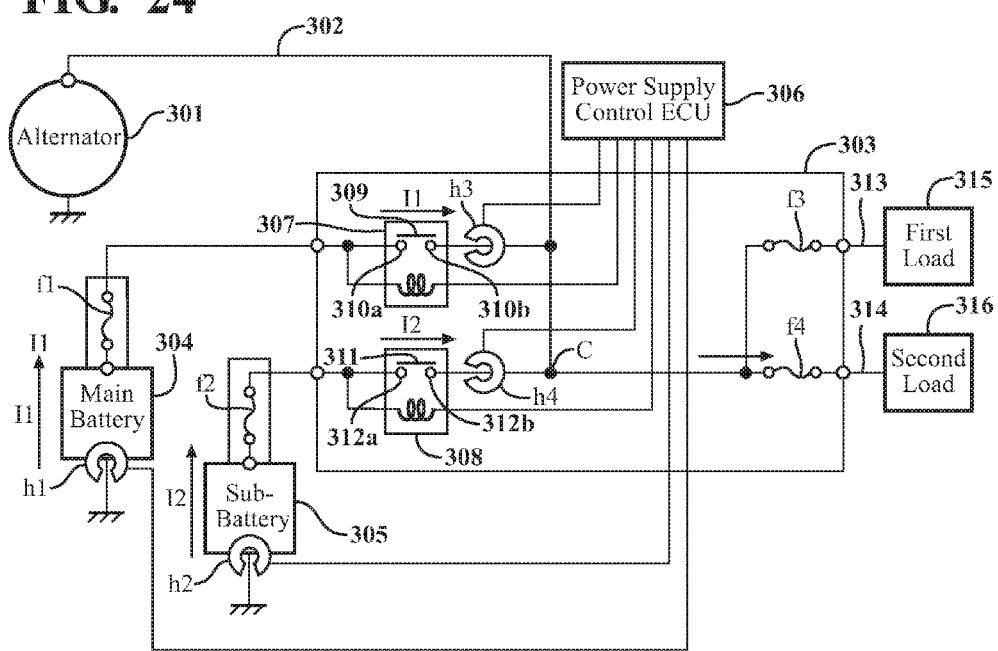
FIG. 24 is a block diagram showing operation according to the twelfth embodiment.

As shown in FIG. 24, while the alternator 301 stops a power generating operation, the first and second loads 315 and 316 are supplied with power from the main battery 304 via the relay 307, and the first and second loads 315 and 316 are supplied with power from the sub-battery 305 via the relay 308.

At this time, the current values of a current I1 detected by the Hall elements h1 and h3 are the same, and the current directions thereof are also the same. Also, the current values of a current I2 detected by the Hall elements h2 and h4 are the same, and the current directions thereof are also the same. Then, the contacts 309 and 311 in the relays 307 and 308 are kept in a conductive state.

Figure 25:
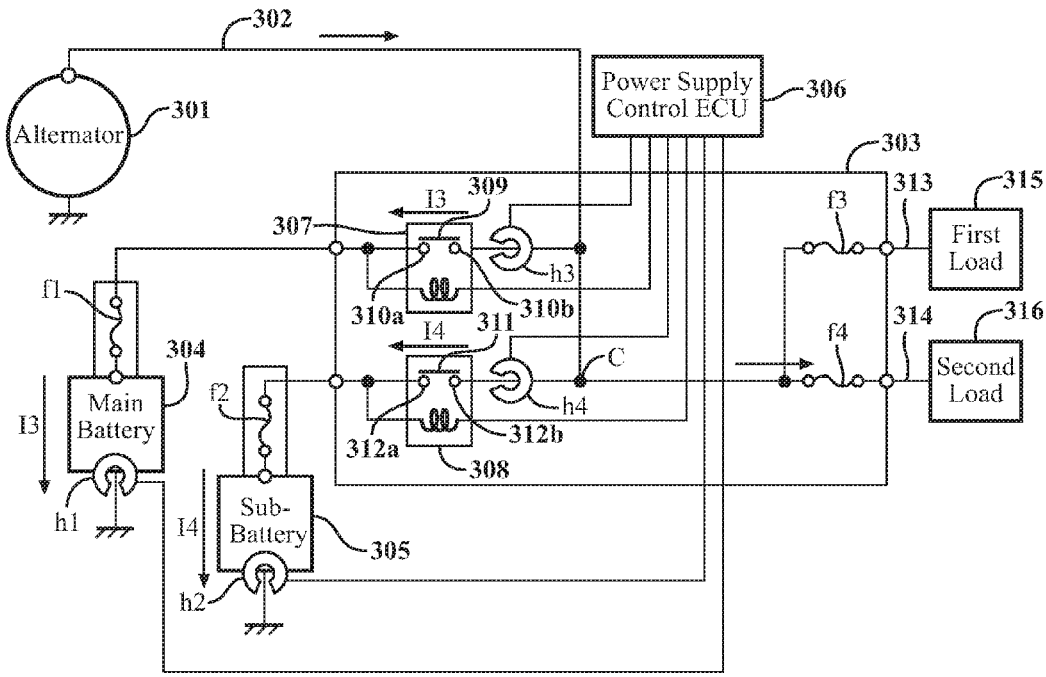
FIG. 25 is a block diagram showing operation according to the twelfth embodiment.

As shown in FIG. 25, when the alternator 301 operates, the generated power thereof is supplied to the main battery 304 via the relay 307, and is also supplied to the sub-battery 305 via the relay 308. The generated power is also supplied to the first and second loads 315 and 316.

At this time, the current values of a current I3 detected by the Hall elements h1 and h3 are the same, and the current directions thereof are also the same. Also, the current values of a current I4 detected by the Hall elements h2 and h4 are the same, and the current directions thereof are also the same. Then, the contacts 309 and 311 in the relays 307 and 308 are kept in a conductive state.

Figure 26:
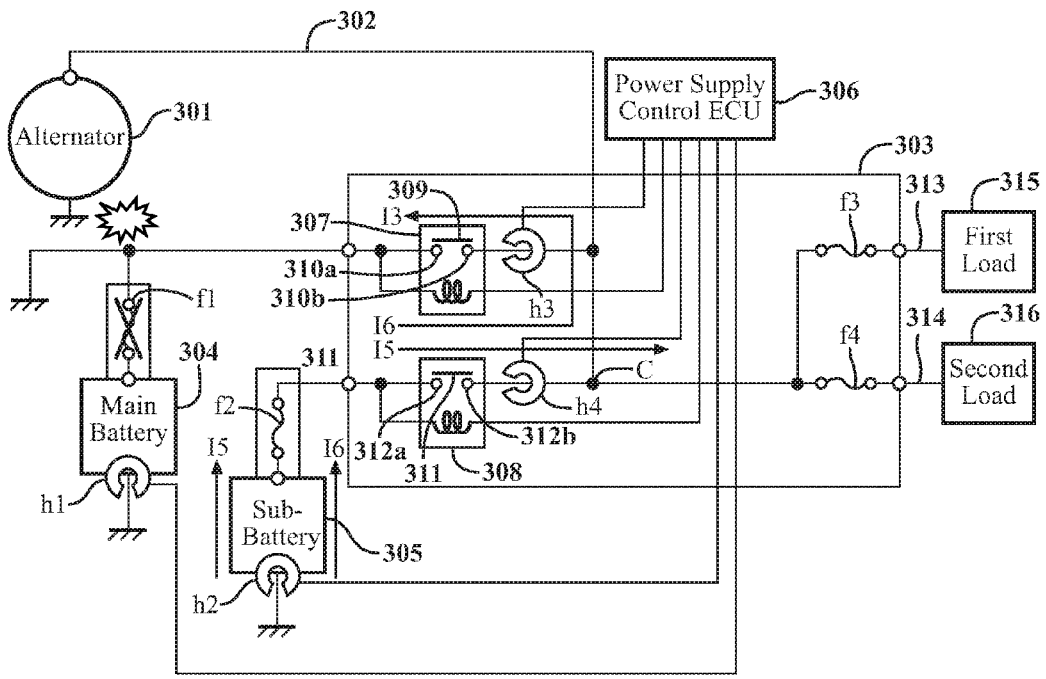
FIG. 26 is a block diagram showing operation according to the twelfth embodiment.

As shown in FIG. 26, for example, if a ground fault has occurred in the main battery 304 and the fuse f1 has blown out, the power is supplied from the sub-battery 305 to the first and second loads 315 and 316 via the relay 308, and a ground fault current is about to flow from the sub-battery 305 via the relays 308 and 307.

Then, the current value and the current direction of currents I5 and I6 flowing respectively through the Hall elements h2 and h4 are the same. On the other hand, even though the current I6 flows through the Hall element h3, no current flows through the Hall element h1.

As a result, the current values and the current directions detected by the Hall elements h1 and h3 do not coincide with each other, and therefore, the contact 309 in the relay 307 is controlled so as to enter a non-conductive state, and generation of a ground fault current by the sub-battery 305 is kept.

Similarly, if a ground fault has occurred in the sub-battery 305, the first and second loads 315 and 316 are supplied with power from the main battery 304. The current values and the current directions detected by the Hall elements h2 and h4 then do not coincide with each other, and therefore, the contact 311 in the relay 308 is controlled so as to enter a non-conductive state, and generation of a ground fault current by the main battery 304 is kept.

The automotive power unit according to the twelfth embodiment can achieve the following effects.

If one of the main battery 304 and the sub-battery 305 is grounded, the first and second loads 315 and 316 can be supplied with power from the other battery. Accordingly, it is possible to achieve redundancy of the power supply, and stably supply necessary power to the loads.

The power can be supplied from the power supply box 303 to each of the loads 315 and 316 using a corresponding one of the power source supply lines 313 and 314. Accordingly, the number of power source supply lines 313 and 314 can be reduced while achieving the redundancy of the power supply, which contributes to a reduction in the vehicle weight of the automobile and enables cost reduction.

The relays 307 and 308, which are opened and closed based on the operation of the Hall elements h1 to h4 and the power supply control ECU 306, can keep a current from flowing between the main battery 304 and the sub-battery 305. Accordingly, if one of the batteries has grounded or failed, it is possible to keep unnecessary discharge of the other battery and protect this battery.

A sufficient power capacity can be readily ensured for the contacts 309 and 311 in the relays 307 and 308. Therefore, even if the first and second loads 315 and 316 are loads that require the supply of a large current, such as a motor and a lamp, the number of power source supply lines 313 and 314 can be reduced while achieving redundancy of the power supply.

The main battery 304 and the sub-battery 305 can be charged by supplying the generated power from the alternator 301 to the power supply box 303 using one power supply line 302, and the first and second loads 315 and 316 can be supplied with the generated power of the alternator 301. Accordingly, the number of power supply lines 302 can be reduced, which contributes to a reduction in the vehicle weight of the automobile and enables cost reduction.

Thirteenth Embodiment

Figure 27:
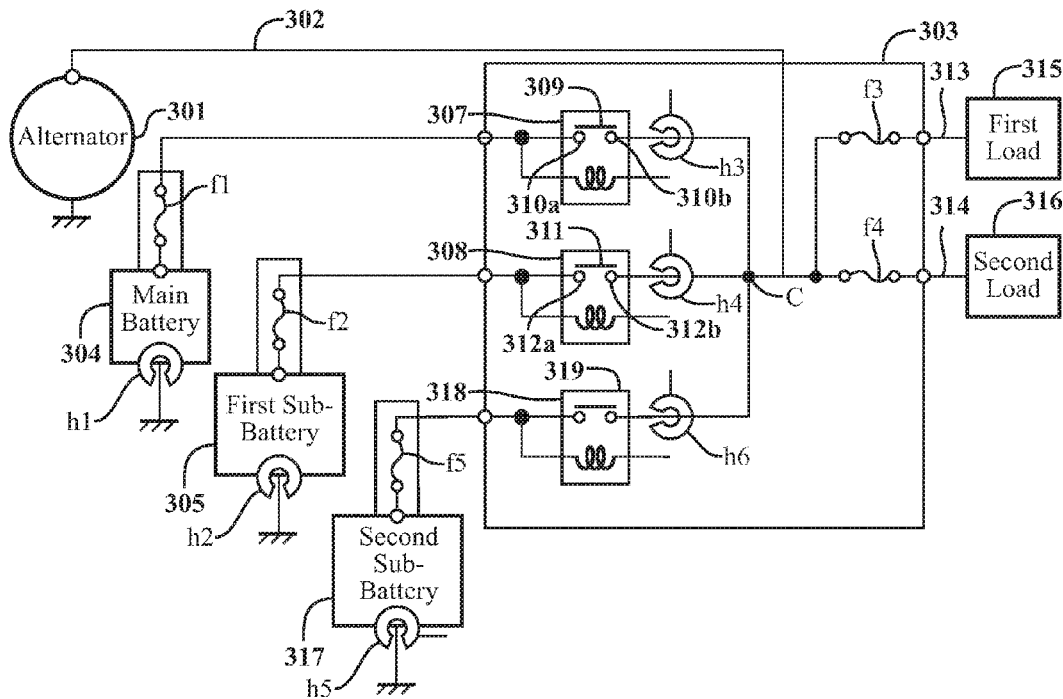
FIG. 27 is a block diagram showing a thirteenth embodiment.

FIG. 27 shows a thirteenth embodiment. This embodiment is different from the twelfth embodiment in that a second sub-battery 317 is added. The same constituent parts as those in the twelfth embodiment will be assigned the same reference numerals, and a detailed description thereof will be omitted.

The second sub-battery 317 is connected to the node C via a fuse f5 and a relay 318. A Hall element h5 is connected to a grounding conductor connected to the second sub-battery 317, and a Hall element h6 is attached to a line between a contact 319 in the relay 318 and the node C.

The Hall element h5 detects the current value and the direction of a current flowing through the second sub-battery 317, and outputs a detection signal thereof to the power supply control ECU 306. The Hall element h6 detects the current value and the direction of a current flowing through a contact 319 in the relay 318, and outputs a detection signal thereof to the power supply control ECU 306.

The power supply control ECU 306 controls the opening and closing of the contact 319 in the relay 318 based on the detection signals output from the Hall elements h5 and h6, similarly to the control for the relays 307 and 308. The remaining configuration is similar to that in the twelfth embodiment.

In the power unit having the above-described configuration, the first and second loads 315 and 316 are supplied with power from at least one of the batteries 304, 305, and 317. If a ground fault has occurred in one of the batteries 304, 305, and 317, the contact in the relay connected to this battery is controlled so as to enter a non-conductive state.

The thirteenth embodiment can achieve the following effects in addition to the effects achieved by the twelfth embodiment.

Since the first and second loads 315 and 316 can be supplied with power from at least one of the three batteries, the redundant functionality can be further enhanced.

Fourteenth Embodiment

Figure 28:
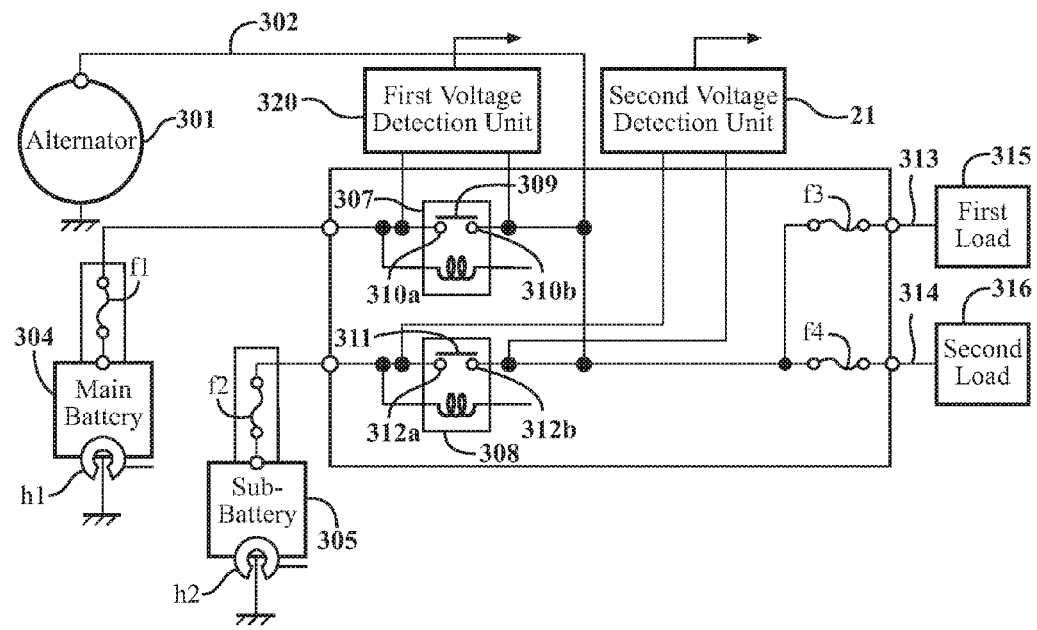
FIG. 28 is a block diagram showing a fourteenth embodiment.

FIG. 28 shows a fourteenth embodiment. In this embodiment, the Hall elements h3 and h4 in the twelfth embodiment are replaced with first and second voltage detection units 320 and 321. The same constituent parts as those in the twelfth embodiment will be assigned the same reference numerals, and a detailed description thereof will be omitted.

The first voltage detection unit 320 detects a voltage across both terminals 310a and 310b of the contact 309 in the relay 307, and outputs a detection signal thereof to the power supply control ECU 306. Similarly, the second voltage detection unit 321 detects a voltage across both terminals 312a and 312b of the contact 311 in the relay 308, and outputs a detection signal thereof to the power supply control ECU 306.

The power supply control ECU 306 detects the current value and the direction of currents flowing through the contacts 309 and 311 in the relays 307 and 308 based on the detection signals output from the first and second voltage detection units 320 and 321, and controls the opening and closing of the contacts 309 and 311 in the relays 307 and 308 based on the detection results, with a control operation similar to that in the twelfth embodiment.

In the power unit having the above-described configuration, the first and second loads 315 and 316 are supplied with power from at least one of the main battery 304 and the sub-battery 305. If a ground fault has occurred in one of the main battery 304 and the sub-battery 305, the contact in the relay connected to this battery is controlled so as to enter a non-conductive state.

Accordingly, effects similar to those of the twelfth embodiment can be achieved.

The power supply control ECU 306 according to the twelfth to fourteenth embodiments functions as a switch control unit. The power supply control ECU 306, the Hall elements h1 to h6, and the voltage detection units 320 and 321 can function, solely or in combination, as a current detection means, a current detection circuit, or a current detection device.

Fifteenth Embodiment

Figure 29:
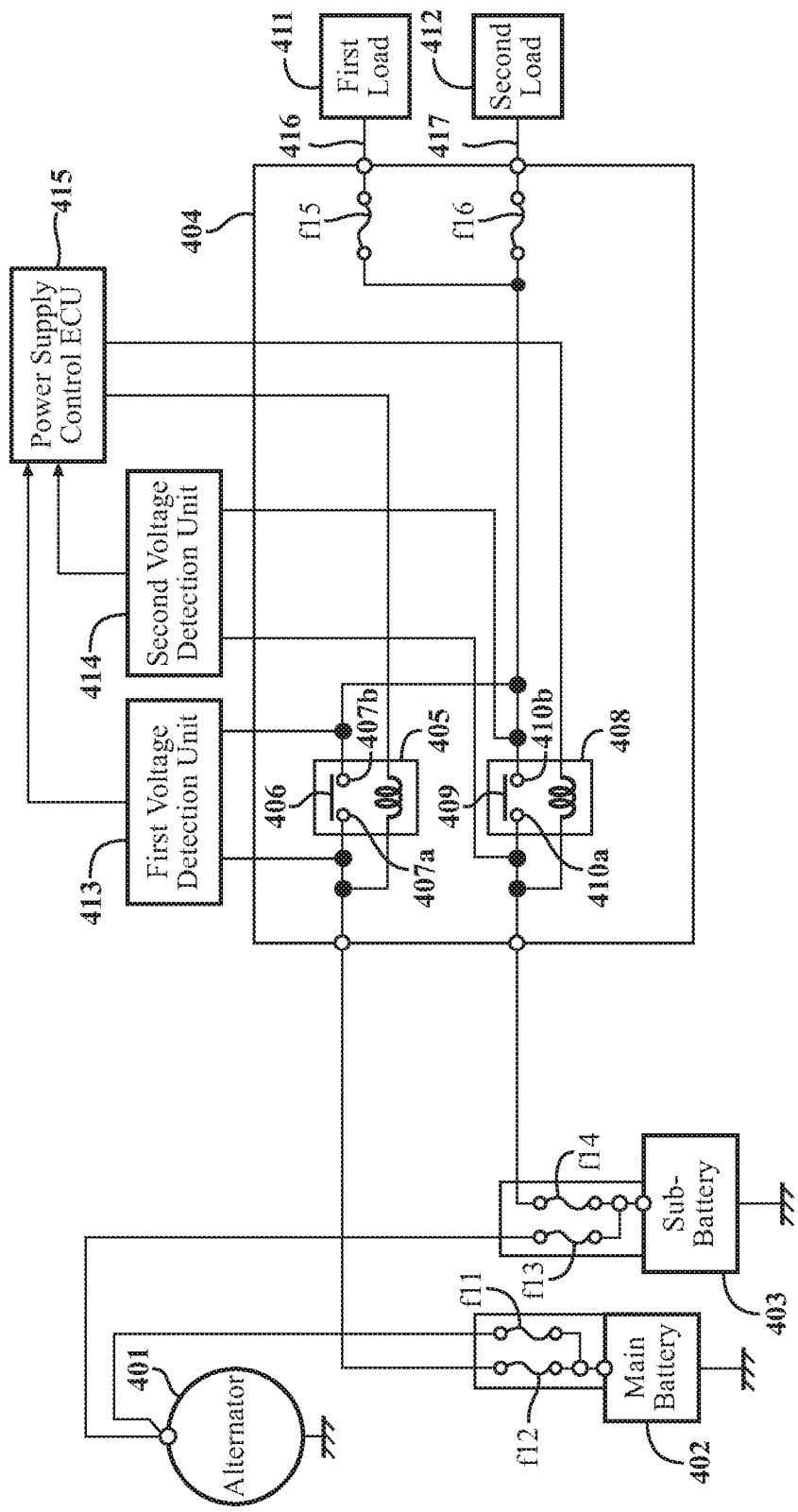
FIG. 29 is a block diagram showing a fifteenth embodiment.
Figure 30:
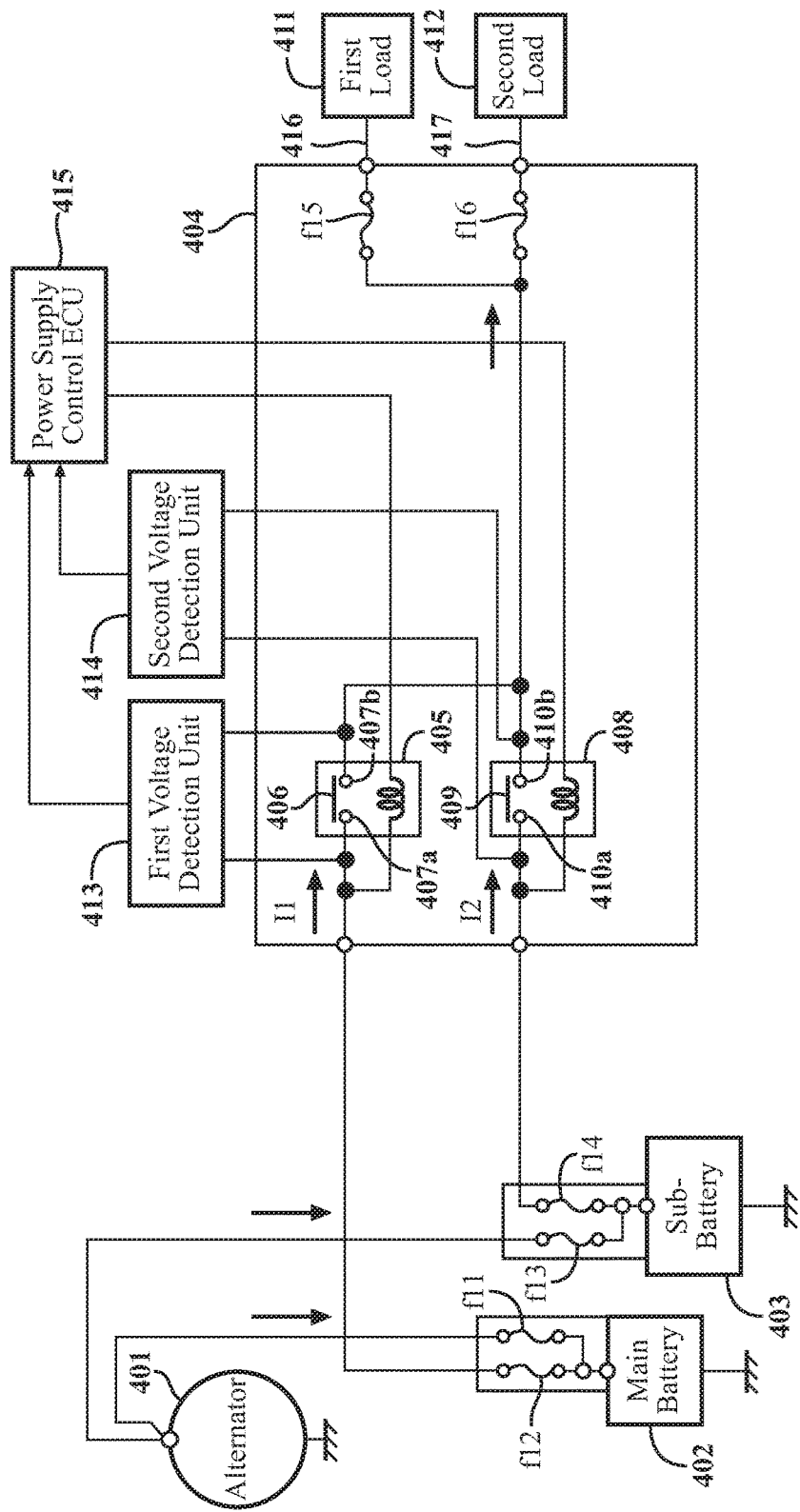
FIG. 30 is a block diagram showing operation according to the fifteenth embodiment.
Figure 31:
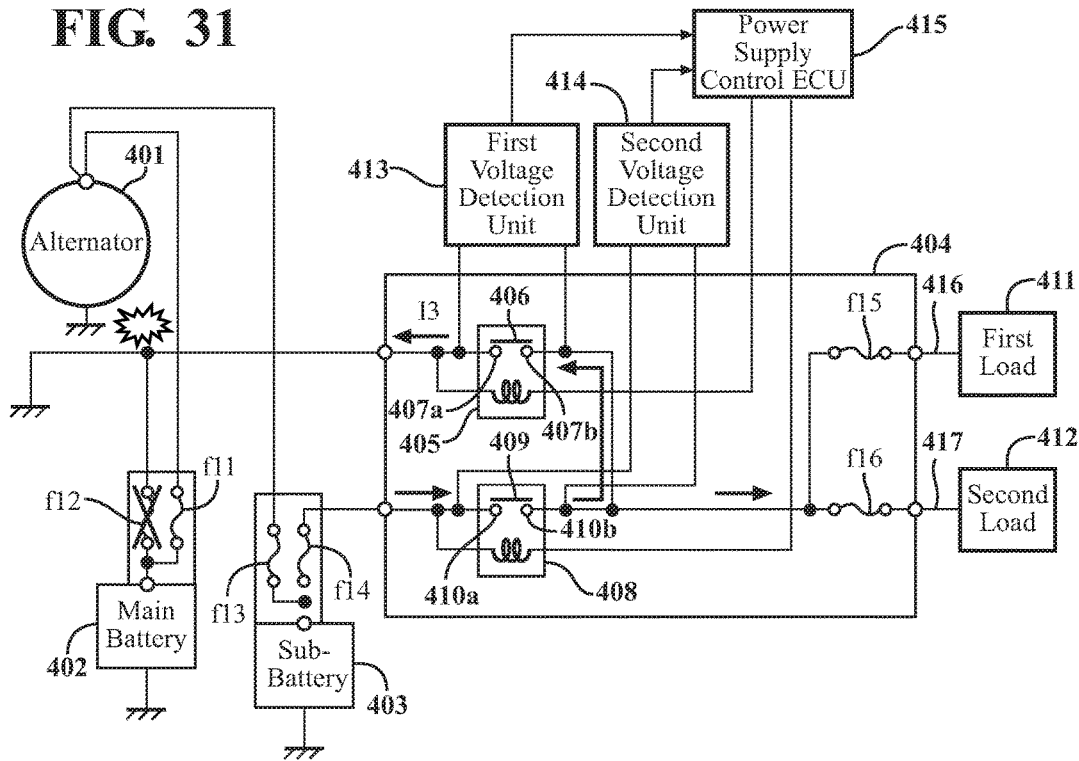
FIG. 31 is a block diagram showing operation according to the fifteenth embodiment.

FIGS. 29 to 31 show a fifteenth embodiment of the automotive power unit. An alternator 401 generates power based on the rotation of an output shaft of an engine during a regenerative operation or during normal driving, and the generated power is supplied to a main battery 402 and a sub-battery 403 respectively via fuses f11 and f13.

The output power of the main battery 402 is supplied to one terminal (input terminal) 407a of a contact 406 in a relay 405, which is provided in a power supply box 404, via a fuse f12. The output power of the sub-battery 403 is supplied to one terminal (input terminal) 410a of a contact 409 in a relay 408, which is provided in the power supply box 404, via a fuse f14. The relays 405 and 408 are favorable examples of a switch.

The other terminals (output terminals) 407b and 410b of the contacts 406 and 409 are connected to a first load 411, which is provided outside the power supply box 404, via a fuse f15 using one power source supply line 416, and is connected to a second load 412, which is provided outside the power supply box 404, via a fuse f16 using one power supply line 417.

Accordingly, if the contact 406 in the relay 405 is in a conductive state, the first and second loads 411 and 412 are supplied with power from the main battery 402. If the contact 409 in the relay 408 is in a conductive state, the first and second loads 411 and 4012 are supplied with power from the sub-battery 403.

Both terminals 407a and 407b of the contact 406 in the relay 405 are connected to a first voltage detection unit 413. The first voltage detection unit 413 detects a voltage across both terminals 407a and 407b, converts the detected voltage into a digital signal, and outputs the digital signal to a power supply control ECU 415. The power supply control ECU 415 can function as a switch control unit.

Both terminals 410a and 410b of the contact 409 in the relay 408 are connected to a second voltage detection unit 414. The second voltage detection unit 414 detects a voltage across both terminals 410a and 410b, converts the detected voltage into a digital signal, and outputs the digital signal to the power supply control ECU 415.

The power supply control ECU 415 determines whether or not to supply an excitation current to a coil in the relay 405 based on the voltage across both terminals 407a and 407b in the relay 405. When the voltage at the terminal 407a is higher than the voltage at the terminal 407b, that is, when a current flows from the terminal 407a toward the terminal 407b, the contact 406 is kept in a conductive state. When the voltage at the terminal 407b is higher than the voltage at the terminal 407a, that is, when a current flows from the terminal 407b toward the terminal 407a, the contact 406 is set to a non-conductive state.

Similarly, the power supply control ECU 415 determines whether or not to supply an excitation current to a coil in the relay 408 based on the voltage across both terminals 410a and 410b in the relay 408. When the voltage at the terminal 410a is higher than the voltage at the terminal 410b, that is, when a current flows from the terminal 410a toward the terminal 410b, the contact 409 is kept in a conductive state. When the voltage at the terminal 410b is higher than the voltage at the terminal 410a, that is, when a current flows from the terminal 410b toward the terminal 410a, the contact 409 is set to a non-conductive state.

Next, the operation of the power unit having the above-described configuration will be described.

When the automobile is driving and the alternator 401 operates while deceleration driving due to a driving force of the engine or regenerative control, the main battery 402 and the sub-battery 403 are charged by the output power of the alternator 401.

As shown in FIG. 30, the output power of the main battery 402 and the sub-battery 403 is supplied to the first and second loads 411 and 412 via the relays 405 and 408. At this time, the current I1 flows through the contact 406 in the relay 405 from the terminal 407a toward the terminal 407b, and therefore, the contact 406 is kept in a conductive state.

Similarly, the current I2 flows through the contact 409 in the relay 408 from the terminal 410a toward the terminal 410b, and therefore, the contact 409 is kept in a conductive state.

As shown in FIG. 31, for example, if the main battery 402 fails due to a ground fault or the like in this state, the output current of the sub-battery 403 is about to flow from the relay 408 to the main battery 402 via the relay 405.

Then, in the relay 405, the current I3 flows from the terminal 407b toward the terminal 407a of the contact 406, and therefore, the voltage at the terminal 407b becomes higher than the voltage at the terminal 407a. As a result, a change in the current direction is detected by the first voltage detection unit 413, and the power supply control ECU 415 performs control such that the contact 406 in the relay 405 is non-conductive.

As a result, a current is kept from flowing from the sub-battery 403 to the main battery 402, and the sub-battery 403 is prevented from failing with the failure of the main battery 402. In this state, the first and second loads 411 and 412 are supplied with power from the sub-battery 403.

If the sub-battery 403 has failed while the main battery 402 is operating normally, similarly, a current is kept from flowing from the main battery 402 to the sub-battery 403, and the first and second loads 411 and 412 are supplied with power from the main battery 402.

The fifteenth embodiment can achieve the following effects.

If one of the main battery 402 and the sub-battery 403 has failed, the first and second loads 411 and 412 can be supplied with power from the other battery. Accordingly, it is possible to achieve redundancy of the power supply, and stably supply necessary power to the loads.

Power can be supplied from the power supply box 404 to each of the loads 411 and 412 using a corresponding one of the power source supply lines 416 and 417. Accordingly, the number of power source supply lines 416 and 417 can be reduced while achieving the redundancy of the power supply, which contributes to a reduction in the vehicle weight of the automobile and enables cost reduction.

A current can be kept from flowing between the main battery 402 and the sub-battery 403 by the relays 405 and 408 that are opened and closed based on the operation of the first and second voltage detection units 413 and 414 and the power supply control ECU 415. Accordingly, if one of the batteries has failed, it is possible to keep unnecessary discharge of the other battery and protect this battery.

Since a sufficient power capacity can be readily ensured for the contacts 406 and 409 in the relays 405 and 408, even if the first and second loads 411 and 412 are loads that require the supply of a large current, such as a motor and a lamp, the number of power source supply lines 416 and 417 can be reduced while achieving redundancy of the power supply.

Sixteenth Embodiment

Figure 32:
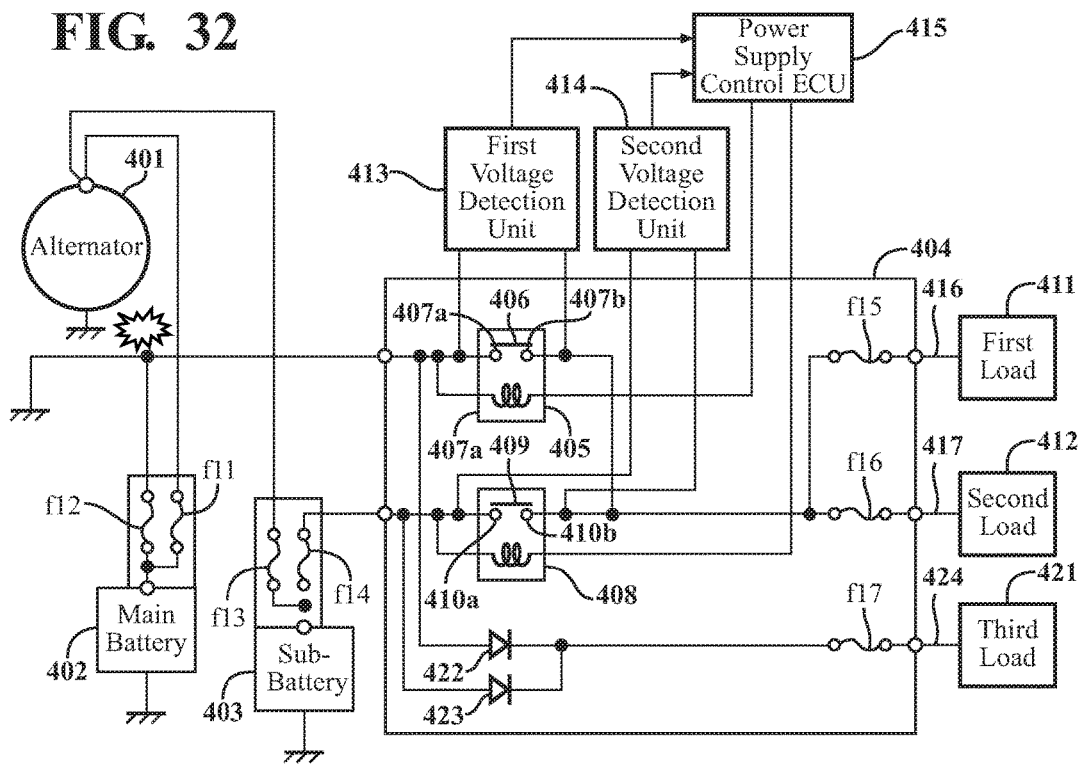
FIG. 32 is a block diagram showing a sixteenth embodiment.

FIG. 32 shows a sixteenth embodiment. This embodiment is different from the fifteenth embodiment in that a configuration is added in which a third load 421 having a small current capacity is supplied with power from the power supply box 404. The same constituent parts as those in the fifteenth embodiment will be assigned the same reference numerals, and a detailed description thereof will be omitted.

The output power of the main battery 402 is supplied to an anode terminal of a diode 422, which is provided in the power supply box 404, and the output power of the sub-battery 403 is supplied to an anode terminal of a diode 423, which is provided in the power supply box 404.

Cathode terminals of the diodes 422 and 423 are connected to the third load 421 via a fuse f17 and a power source supply line 424 provided outside the power supply box 404. The third load 421 is a load having a smaller current capacity than the first and second loads 411 and 412.

In the power unit having the above-described configuration, the operation of supplying power to the first and second loads 411 and 412 and the operation of the relays 405 and 408 at the time of a failure of the main battery 402 or the sub-battery 403 are similar to those in the fifth embodiment.

If the main battery 402 and the sub-battery 403 are operating normally, the third load 421 is supplied with power from the main battery 402 and the sub-battery 403 via the diodes 422 and 423.

If the main battery 402 has failed, the third load 421 is supplied with power from the sub-battery 403 via the diode 423, and a current is kept from flowing from the sub-battery 403 to the main battery 402 by the diode 422.

If the sub-battery 403 has failed, the third load 421 is supplied with power from the main battery 402 via the diode 422, and a current is kept from flowing from the main battery 402 to the sub-battery 403 by the diode 423.

The automotive power unit having the above-described configuration can achieve the following effects in addition to the effects achieved by the fifteenth embodiment.

A load having a small current capacity can be supplied with power from the main battery 402 and the sub-battery 403 via the diodes 422 and 423. In addition, if one of the batteries has failed, a current can be prevented from flowing from the other battery to the one of the battery.

Since a functionality equivalent to that of the relays 405 and 408 that are controlled by the power supply control ECU 415 can be achieved by the diodes 422 and 423, the costs can be reduced compared with the case of using the relays.

Seventeenth Embodiment

Figure 33:
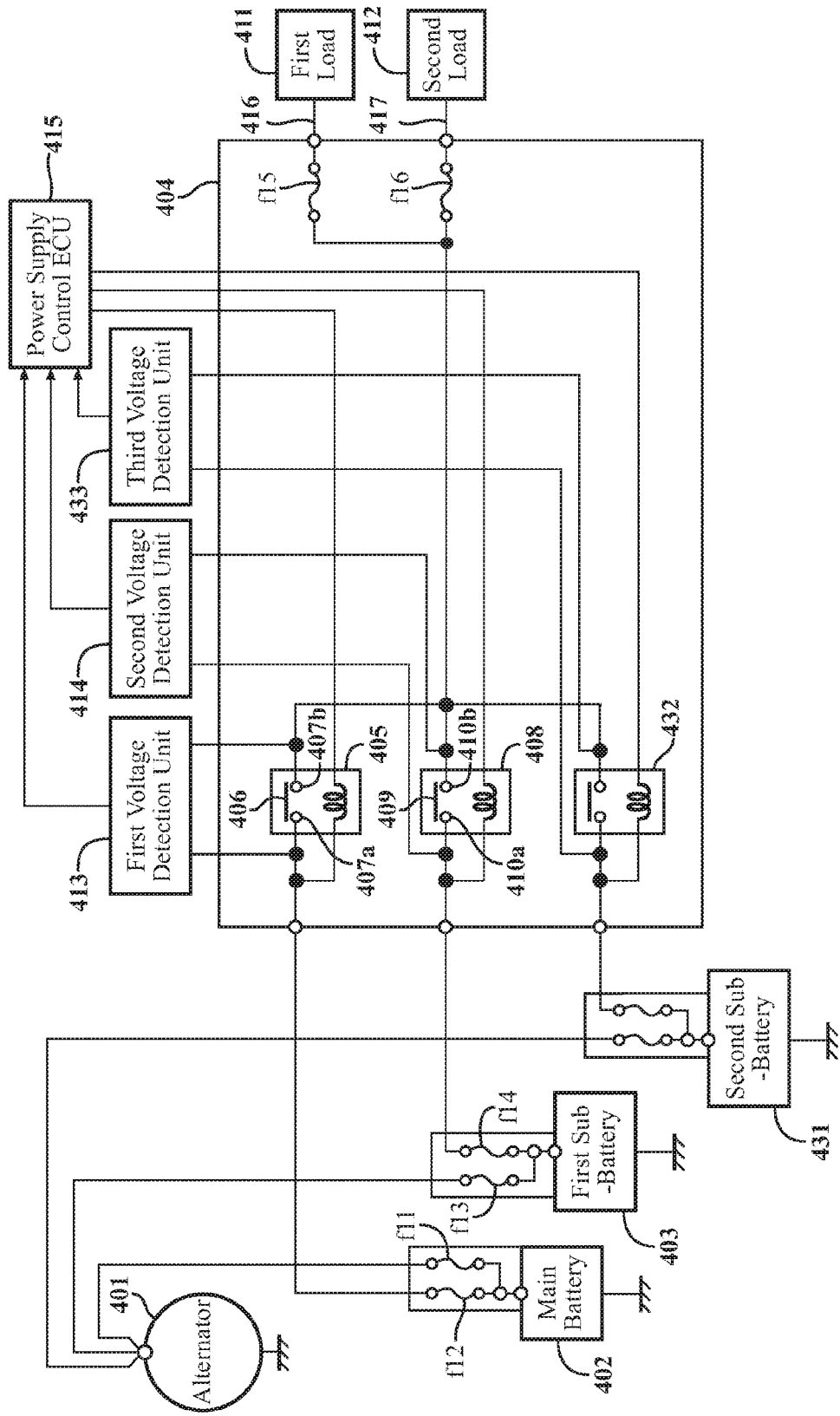
FIG. 33 is a block diagram showing a seventeenth embodiment.

FIG. 33 shows a seventeenth embodiment. This embodiment adds a second sub-battery 431 to the fifteenth embodiment, and enables power to be supplied from the second sub-battery 431 to the first and second loads 411 and 412 via the relay 432. The same constituent parts as those in the fifteenth embodiment will be assigned the same reference numerals, and a detailed description thereof will be omitted.

Similar to the relays 405 and 408 in the fifteenth embodiment, the relay 432 is subjected to open/close control by a third voltage detection unit 433 and the power supply control ECU 415.

This configuration enables power supply to the first and second loads 411 and 412 from at least one of the three batteries. Therefore, the redundant functionality of the power supply is further enhanced, and a current can be kept from flowing between the batteries.

The sixteenth embodiment can achieve the following effects in addition to the effects achieved by the fifteenth embodiment.

Since the first and second loads 411 and 412 can be supplied with power from at least one of the three batteries, the redundant functionality can be further enhanced.

The above embodiments may be modified as follows.

The power unit according to the first embodiment may be provided with a detection means for detecting a power supply voltage supplied to the loads 7 and 11 when the contacts t1 to t4 are in a conductive state or a non-conductive state. A switch control unit may control the opening and closing of the contacts t1 to t4 in the relays 5, 9, 13, and 16 based on the detection result of this detection means. The detection means may be a voltage sensor that is connected to the switch control unit, or may be included in the switch control unit. This configuration enables detection of blowout of the fuses 4, 8, 12, and 15, fusing of the contacts t1 to t4, break of the power source lines 6, 10, 14, and 17, and the like. With this configuration, the loads 7 and 11 can be supplied with power from the main battery 1 or the sub-battery 2 through a power supply path that operates normally.

Figure 13:
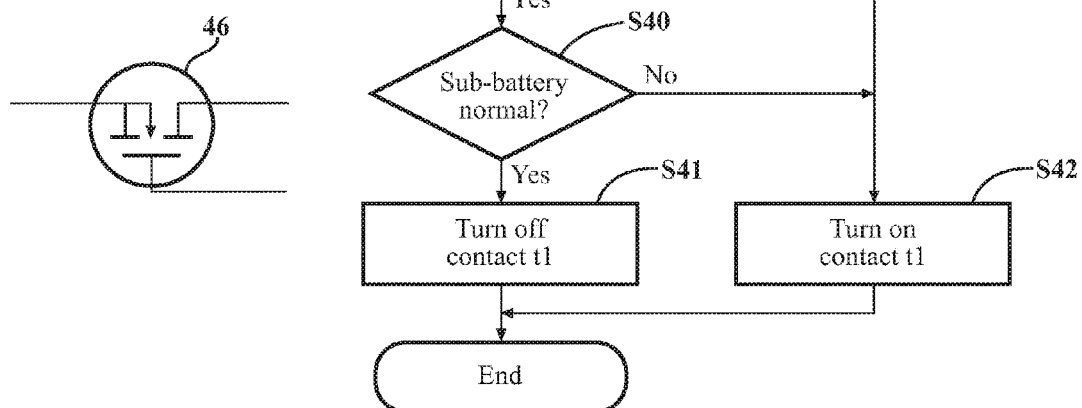
FIG. 13 is an illustrative diagram showing another example.

In the first to third, fifth to seventh, and twelfth to seventeenth embodiments, a power MOSFET 46 shown in FIG. 13 may be used in place of the relays 5, 9, 13, 16, 112, 113, 307, 308, 318, 405, and 408.

In the seventh embodiment, the output voltage of the batteries 101 and 102 may be detected by battery sensors connected to the main battery 101 and the sub-battery 102 detecting a current output from the respective batteries (step S32). The same applies to the fourth to sixth embodiments.

The switch control unit may be provided with one or more processors, and a memory that is combined with the processors and includes a command capable of being executed by the processors. The memory may be of a built-in type, such as a ROM or a RAM, or may be of a removable type.

In the eighth and ninth embodiments, the junction boxes 203 and 206 may be a common junction box. The relay 226 may be housed in a junction box.

In the eighth to eleventh embodiments, the separation device may be a semiconductor contact that detects an output voltage of a storage battery in a short-circuit state and separates this storage battery from the other storage battery.

In the fifteenth to seventeenth embodiments, the direction of the currents flowing through the contacts in the relays may be detected by Hall elements.

The embodiments and the modifications may be combined as appropriate. Some configuration in one embodiment may be replaced with some configuration in another embodiment. Some configuration in one embodiment may be added to another embodiment. A person skilled in the art would understand the effects achieved by such replacement and/or addition from the disclosure of the specification and drawings of the present application.

Figure 14:
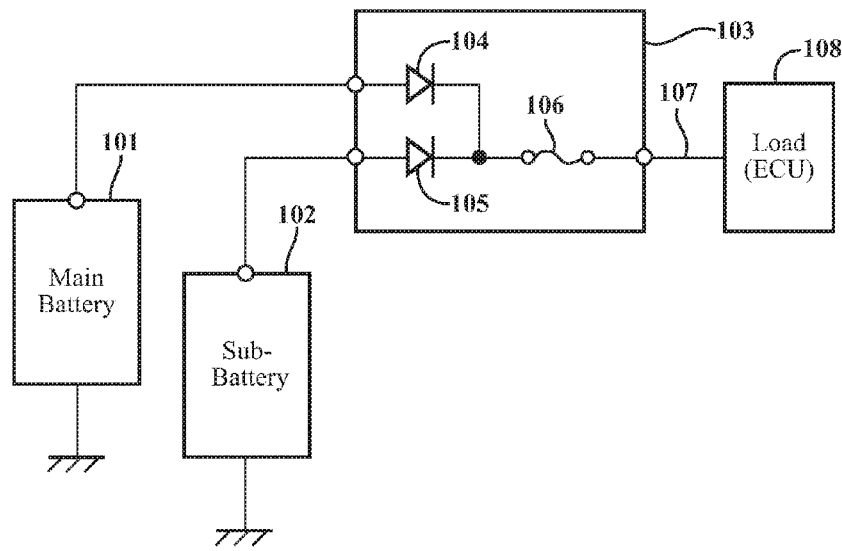
FIG. 14 is a block diagram showing a fourth embodiment.

For example, the switch means 18a in FIG. 1 may be connected to the load 7 using the circuit of the power supply box 103 in FIG. 14.

The microcomputer 132 in FIG. 16 and the power supply monitoring ECU 144 in FIG. 17 may be configured to enable a storage battery selecting operation to be performed by the relays 112 and 113 based on the control signal we that is output from a load control unit such as the wiper ECU 24, the lamp ECU 26, or the like in FIG. 1, for example. The same applies to the power supply control ECU 306 in FIGS. 23 to 26, and the power supply control ECU 415 in FIGS. 29 to 33.

For example, the switch means 18a to 18c in FIGS. 1, 4, and 10 may be configured similarly to the separation devices 221, 222, and 245 in FIGS. 18 to 22.

The switch control unit 19 in FIG. 1, the microcomputer 32 in FIG. 4, or the power supply monitoring ECU 44 in FIG. 10 may be configured to control the opening and closing of the relays 207, 211, and 241 in FIGS. 18 to 22.

This disclosure includes the following examples.

[Note 1] An automotive power unit that is used together with a plurality of loads and provided with a plurality of storage batteries, and a power supply box which is arranged between the storage batteries and the plurality of loads and supplies power to each load from at least one of the storage batteries, the automotive power unit including:

a current control circuit that supplies power supplied from the storage batteries, from the power supply box to each of the loads using one power source line, allows supply of the power from the storage batteries to the loads, and keeps a current from flowing between the plurality of storage batteries.

[Note 2] An automotive power unit provided with a first storage battery, a second storage battery, and a redundant power supply device configured to supply power to a load group from at least one of the first storage battery and the second storage battery, the automotive power unit including:

a separation device arranged between the redundant power supply device and each of the first storage battery and the second storage battery and, when one of the first storage battery and the second storage battery has made a short circuit, opens a contact provided between the one of the storage batteries and the other of the storage batteries.

[Note 3] An automotive power unit provided with a plurality of storage batteries, a power supply box that is arranged between the storage batteries and a plurality of loads and supplies power to the loads from at least one of the storage batteries, and an alternator that supplies power to the storage batteries and the loads, the automotive power unit including:

a plurality of switches provided in the power supply box and each having an input terminal connected to a corresponding one of the storage batteries;

power source supply lines that connect a node connecting output terminals of the switches to the loads in one-to-one correspondence;

a power supply line that supplies power from the alternator to the node;

current detection circuits, each of which detects a current value of a current flowing through a corresponding one of the switches and the storage batteries; and a control circuit that, when a current value of a current flowing through each of the storage batteries is different from a current value of a current flowing through a switch connected to this storage battery, controls this switch so as to enter a non-conductive state based on a detection signal of the current detection circuit.

[Note 4] An automotive power unit provided with a plurality of storage batteries, and a power supply box that is arranged between the storage batteries and a plurality of loads and supplies power to the loads from at least one of the storage batteries, the automotive power unit including:

a plurality of switches provided in the power supply box and each having an input terminal connected to a corresponding one of the storage batteries; and power source supply lines connected to the loads in one-to-one correspondence, wherein the switch control unit detects a direction of a current flowing through each of the switches, and controls the opening and closing of the plurality of switches so as to cut off a current flowing from one of the storage batteries toward the other of the storage batteries.

The present invention is not limited to the above-described examples. For example, these should not be interpreted such that the above-described exemplary features are essential for the present invention. The subject of the present invention may lie in fewer features than all features in the above-disclosed specific embodiments.

DRAWINGS

Figure 2:
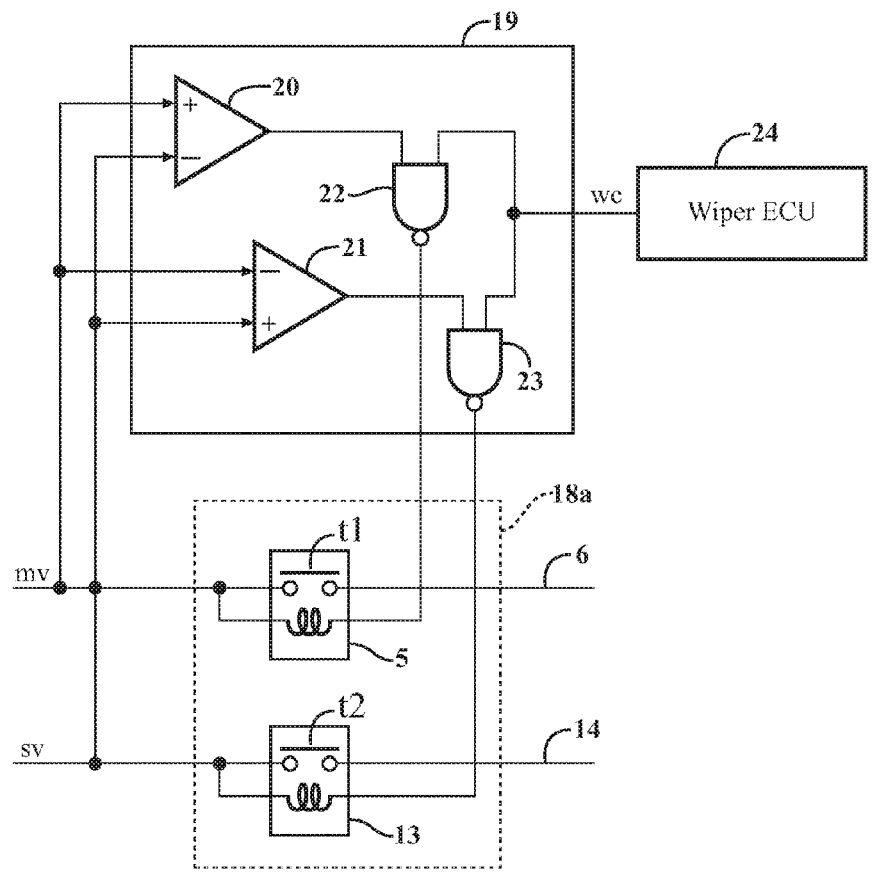
FIG. 2 is a block diagram showing a switch control unit according to the first embodiment.

FIG. 1
1 MAIN BATTERY
2 SUB-BATTERY
7 LOAD (MOTOR)
11 LOAD (LAMP)
19 SWITCH CONTROL UNIT
24 WIPER ECU
25 OTHER LOADS
26 LAMP ECU
FIG. 2
24 WIPER ECU
FIG. 4
1 MAIN BATTERY
2 SUB-BATTERY
7 LOAD (MOTOR)
24 WIPER ECU
32 MICROCOMPUTER
33 POWER SUPPLY MONITORING UNIT
34 RELAY CONTROL UNIT
FIG. 7
S1 MONITOR BATTERY VOLTAGE
S3 TURN ON CONTACT t1
S4 TURN OFF CONTACT t2

Figure 18:
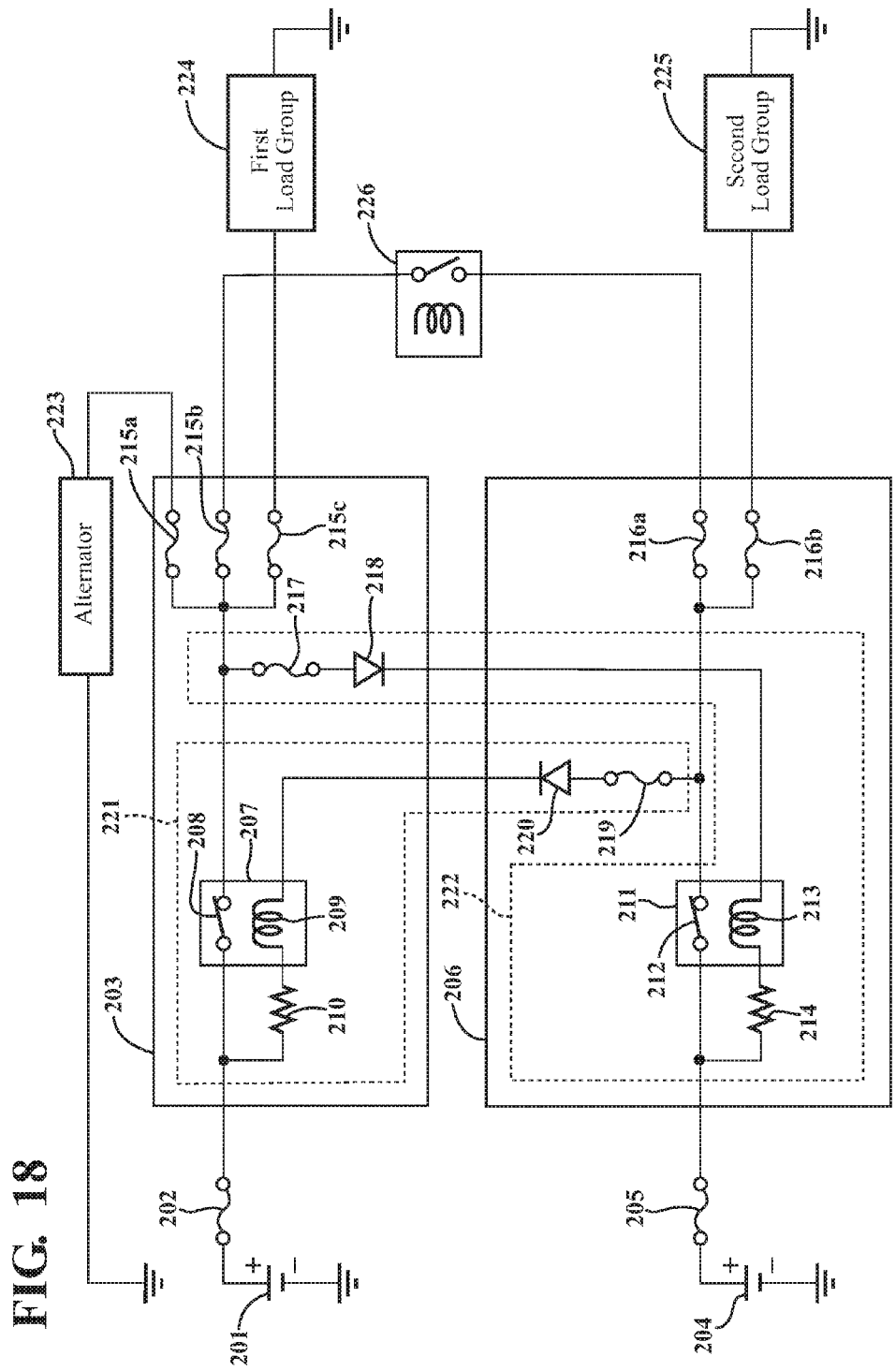
FIG. 18 is a circuit diagram showing an eighth embodiment.

S5 TURN OFF CONTACT t1
S6 TURN ON CONTACT t2
FIG. 8
S11 MONITOR BATTERY VOLTAGE
S13 TURN OFF CONTACT t1
S14 TURN ON CONTACT t1
S16 TURN OFF CONTACT t2
S17 TURN ON CONTACT t2
FIG. 9
S21 MONITOR BATTERY VOLTAGE
S22 CALCULATE BATTERY VOLTAGE DIFFERENCE
S24 TURN ON CONTACT t1
S25 TURN ON CONTACT t2
S27 TURN ON CONTACT t1
S28 TURN OFF CONTACT t2
S29 TURN OFF CONTACT t1
S30 TURN ON CONTACT t2
FIG. 10
1 MAIN BATTERY
2 SUB-BATTERY
24 WIPER ECU
42 BATTERY SENSOR
43 BATTERY SENSOR
44 POWER SUPPLY MONITORING ECU
45 STARTER MOTOR
FIG. 11
st INPUT
FIG. 12
S31 ACQUIRE BATTERY VOLTAGE (BATTERY SENSOR)
S32 MAIN BATTERY ABNORMAL?
S33 TURN OFF CONTACT t1
S34 TURN ON CONTACT t1
S35 SUB-BATTERY ABNORMAL?
S36 TURN OFF CONTACT t2
S37 TURN ON CONTACT t2
S38 DETECT STARTER START SIGNAL (BATTERY SENSOR)
S39 START STARTER?
S40 SUB-BATTERY NORMAL?
S41 TURN OFF CONTACT t1
S42 TURN ON CONTACT t1
FIG. 14
101 MAIN BATTERY
102 SUB-BATTERY
108 LOAD (ECU)
FIG. 15
101 MAIN BATTERY
102 SUB-BATTERY
122 LOAD (MOTOR)
123 LOAD (LAMP)
FIG. 16
101 MAIN BATTERY
102 SUB-BATTERY
122 LOAD (MOTOR)
123 LOAD (LAMP)
132 MICROCOMPUTER
133 POWER SUPPLY MONITORING UNIT
134 RELAY CONTROL UNIT
FIG. 17
101 MAIN BATTERY
102 SUB-BATTERY
122 LOAD (MOTOR)
123 LOAD (LAMP)
144 POWER SUPPLY MONITORING ECU
145 STARTER MOTOR
FIG. 18
223 ALTERNATOR
224 FIRST LOAD GROUP
225 SECOND LOAD GROUP
FIG. 19
223 ALTERNATOR
224 FIRST LOAD GROUP
225 SECOND LOAD GROUP
235 POWER SUPPLY CONTROL ECU
FIG. 23-FIG. 26
301 ALTERNATOR
304 MAIN BATTERY
305 SUB-BATTERY
306 POWER SUPPLY CONTROL ECU
315 FIRST LOAD
316 SECOND LOAD
FIG. 27
301 ALTERNATOR
304 MAIN BATTERY
305 FIRST SUB-BATTERY
317 SECOND SUB-BATTERY
315 FIRST LOAD
316 SECOND LOAD
FIG. 28
301 ALTERNATOR
304 MAIN BATTERY
305 SUB-BATTERY
315 FIRST LOAD
316 SECOND LOAD
320 FIRST VOLTAGE DETECTION UNIT
SECOND VOLTAGE DETECTION UNIT
FIG. 29-FIG. 31
401 ALTERNATOR
402 MAIN BATTERY
403 SUB-BATTERY
411 FIRST LOAD
412 SECOND LOAD
413 FIRST VOLTAGE DETECTION UNIT
414 SECOND VOLTAGE DETECTION UNIT
415 POWER SUPPLY CONTROL ECU
FIG. 32
401 ALTERNATOR
402 MAIN BATTERY
403 SUB-BATTERY
411 FIRST LOAD
412 SECOND LOAD
421 THIRD LOAD
413 FIRST VOLTAGE DETECTION UNIT
414 SECOND VOLTAGE DETECTION UNIT
415 POWER SUPPLY CONTROL ECU
FIG. 33
401 ALTERNATOR
402 MAIN BATTERY
403 FIRST SUB-BATTERY
431 SECOND SUB-BATTERY
411 FIRST LOAD
412 SECOND LOAD
413 FIRST VOLTAGE DETECTION UNIT
414 SECOND VOLTAGE DETECTION UNIT
433 THIRD VOLTAGE DETECTION UNIT
415 POWER SUPPLY CONTROL ECU

The invention claimed is:
1. An automotive power unit comprising:
a plurality of storage batteries;
a power supply box to be arranged between the storage batteries and a load;

a switch means for selecting whether or not to supply power to the load from the storage batteries, the switch means being provided in the power supply box;

a redundant power supply device configured to supply power to a load group from at least one of a first storage battery and a second storage battery that are included in the plurality of storage batteries;

a separation device arranged between the redundant power supply device and each of the first storage battery and the second storage battery and, when one of the first storage battery and the second storage battery has made a short circuit, opens a contact provided between the one of the storage batteries and the other of the storage batteries; and a switch control unit that detects output voltages of the storage batteries and controls opening and closing of the switch means so as to select the storage battery for supplying power to the load, wherein the switch control unit enables, based on a control signal that is output from a load control unit when the load is driven, a storage battery selecting operation is to be performed by the switch means.

2. The automotive power unit according to claim 1, wherein the switch control unit includes:

a comparator that compares an output voltages of the storage batteries with each other; and a logic circuit that controls, based on the control signal, opening and closing of the switch means in correspondence with a comparison result of the comparator.

3. The automotive power unit according to claim 1, wherein the switch control unit includes:

a power supply monitoring unit that selects, based on the output voltages of the storage batteries, one of the storage batteries based on a preset program; and a driving unit that controls, based on the control signal, the switch means so as to supply power to the load from the storage battery selected by the power supply monitoring unit.

4. The automotive power unit according to claim 1, wherein the switch control unit includes a power supply monitoring ECU that selects, based on the output voltages of the storage batteries, one of the storage batteries based on a preset program, and controls, based on the control signal, the switch means so as to supply power to the load from the selected storage battery.

5. The automotive power unit according to claim 1, wherein the switch means includes at least one relay that is subjected to open/close control by the switch control unit.

6. The automotive power unit according to claim 1, wherein the switch means includes at least one power MOSFETs that is subjected to open/close control by the switch control unit.

7. The automotive power unit according to claim 1, further comprising:

a current control means that supplies power supplied from the storage batteries, from the power supply box to each of the loads using at least one power source line, allows supply of power from the storage batteries to the load, and keeps a current from flowing between the storage batteries.

8. The automotive power unit according to claim 7, wherein the current control means includes:

a plurality of switches constituting the switch means, and each being arranged between the power source line and a corresponding storage battery; and the switch control unit including a power supply monitoring unit that monitors the output voltages of the storage batteries, and a driving unit that makes a switch connected to a storage battery having a low output voltage non-conductive when the power supply monitoring unit has detected a difference between the output voltages of the storage batteries, and at least one of the plurality of switches are provided in the power supply box.

9. The automotive power unit according to claim 7, wherein the current control means includes a comparator that compares the output voltages of the storage batteries.

10. The automotive power unit according to claim 8, wherein the power supply monitoring unit is configured to, when detecting that an output voltage of each of the storage batteries or a difference between the output voltages of the storage batteries is in an abnormal range, make a switch means connected to this storage battery non-conductive, and is provided in the power supply box.

11. The automotive power unit according to claim 8, wherein one of the storage batteries is directly connected to a starter motor, and a switch connected to the one of the storage batteries is set to a non-conductive state when the starter motor operates.

12. The automotive power unit according to claim 7, wherein the current control means is constituted by a plurality of diodes, each having an anode connected to the storage batteries side, and having a cathode connected to the power source line side.

13. The automotive power unit according to claim 1, wherein the separation device includes a relay that is provided with a coil through which, when one of the first storage battery and the second storage battery has made a short circuit, a current serving as an excitation current flows toward the one of the storage batteries from the other of the storage batteries, and is also provided with a contact that is opened based on the excitation current and electrically separates the one of the storage batteries from the other of the storage batteries.

14. The automotive power unit according to claim 13, wherein the separation device is provided with a forcible separation device that is connected to the relay and causes an excitation current to flow through the coil based on input of a separation signal.

15. The automotive power unit according to claim 1, wherein the separation device includes a relay that is provided with a coil, an excitation current that is supplied from one of the first storage battery and the second storage battery and flows through the coil being cut off when the one of the first storage battery and the second storage battery has made a short circuit, and is also provided with a contact that is opened based on the cutting-off of the excitation current and electrically separates the one of the storage batteries from the other of the storage batteries.

16. The automotive power unit according to claim 1, wherein the separation device is housed in the power supply box provided between the first and the second storage batteries and the redundant power supply device.

17. The automotive power unit according to claim 1, wherein the power supply box is configured to supply power to a plurality of loads from at least one of the plurality of storage batteries, the power unit has an alternator that supplies power to the storage batteries and the loads;

a plurality of switches included in the switch means and each having an input terminal connected to a corresponding one of the plurality of storage batteries; at least one power source supply lines each connecting a node between output terminals of the plurality of switches to a corresponding one of the plurality of loads; and a power supply line that supplies power from the alternator to the node and wherein the switch control unit is configured to directly or indirectly acquire current values of currents flowing through the plurality of switches and the plurality of storage batteries and, when a current value of a current flowing through each of the storage batteries and the current value of a current flowing through a switch connected to this storage battery are different, performs control for setting this switch to a non-conductive state.

18. The automotive power unit according to claim 17, further comprising:

a plurality of current detection means, each of which detects a current value of a current flowing through a corresponding one of the plurality of switches or a corresponding one of the plurality of storage batteries, wherein the switch control unit is configured to, when the current value of a current flowing through each of the storage batteries and the current value of a current flowing through a switch connected to this storage battery are different based on a detection signal of the plurality of current detection means, performs control for setting this switch to a non-conductive state.

19. The automotive power unit according to claim 18, wherein the current detection means are each constituted by a Hall element.

20. The automotive power unit according to claim 17, further comprising:

a voltage detection unit that detects a voltage across an input terminal and an output terminal of each of the switches, wherein the switch control unit detects a current value of a current flowing through each of the switches based on the voltage across the terminals detected by the voltage detection unit.

21. The automotive power unit according to claim 17, wherein the switches are each constituted by a relay that is subjected to open/close control based on an excitation current which is output from the switch control unit.

22. The automotive power unit according to claim 17, wherein the plurality of storage batteries are three storage batteries, the plurality of switches are three switches connected to the three storage batteries in one-to-one correspondence, and current detection means are provided so as to each detect a current value of a current flowing through a corresponding one of the three switches or a corresponding one of the three storage batteries.

23. The automotive power unit according to claim 1, wherein the power supply box is configured to supply power to a plurality of loads from at least one of the plurality of storage batteries, the power unit has a plurality of switches included in the switch means and each having an input terminal connected to a corresponding one of the plurality of storage batteries; and a power supply line connected to the loads in one-to-one correspondence, and wherein the switch control unit detects a direction of a current flowing through each of the switches, and controls opening and closing of the plurality of switches so as to cut off a current flowing from one of the storage batteries toward the other of the storage batteries.

24. The automotive power unit according to claim 23, further comprising:

a voltage detection unit that detects a voltage across an input terminal and an output terminal of each of the switches, wherein the switch control unit detects, based on a detection signal of the voltage detection unit, a direction of a current flowing between the input terminal and the output terminal of each of the switches, and controls opening and closing of each of the switches.

25. The automotive power unit according to claim 24, wherein the switches are each constituted by a relay that is subjected to open/close control based on an excitation current which is output from the switch control unit.

26. The automotive power unit according to claim 25, further comprising:

a plurality of diodes connected to the plurality of switches in one-to-one correspondence, each of the plurality of diodes having an anode terminal connected to the plurality of storage batteries in one-to-one correspondence, and a cathode terminal connected to one of the plurality of loads or each of the loads.

27. The automotive power unit according to claim 24, wherein the plurality of storage batteries are three storage batteries, the plurality of switches are three switches connected to the three storage batteries in one-to-one correspondence, and the voltage detection unit is three voltage detection units each detecting a voltage across an input terminal and an output terminal of a corresponding one of the three switches.

* * * * *